(12) United States Patent
Uecker et al.

(10) Patent No.: US 11,344,964 B2
(45) Date of Patent: May 31, 2022

(54) SYSTEMS, METHODS, AND APPARATUS TO CONTROL WELDING ELECTRODE PREHEATING

(71) Applicant: Illinois Tool Works Inc., Glenview, IL (US)

(72) Inventors: James Lee Uecker, Appleton, WI (US); Jake Zwayer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 878 days.

(21) Appl. No.: 15/618,926

(22) Filed: Jun. 9, 2017

(65) Prior Publication Data

US 2018/0354051 A1 Dec. 13, 2018

(51) Int. Cl.
*B23K 9/10* (2006.01)
*B23K 9/095* (2006.01)
(Continued)

(52) U.S. Cl.
CPC .......... *B23K 9/1093* (2013.01); *B23K 9/0953* (2013.01); *B23K 9/125* (2013.01); *B23K 9/173* (2013.01)

(58) Field of Classification Search
CPC .... B23K 9/0953; B23K 9/1093; B23K 9/125; B23K 9/173
See application file for complete search history.

(56) References Cited

U.S. PATENT DOCUMENTS 3,030,495 A 4/1962 Anderson
3,549,857 A 12/1970 Carter
(Continued)

FOREIGN PATENT DOCUMENTS

AT 413801 6/2006
CA 2862671 10/2013
(Continued)

OTHER PUBLICATIONS

Int'l Search Report and Written Opinion for PCT/US2018/036852 dated Oct. 2, 2018 (17 pgs.).
(Continued)

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

Systems, methods, and apparatus to control welding electrode preheating are disclosed. An example consumable electrode-fed welding-type system includes a welding-type current source configured to provide welding-type current to a welding-type circuit, the welding-type circuit comprising a welding-type electrode and a first contact tip of a welding torch; an electrode preheating circuit configured to provide preheating current through a first portion of the welding-type electrode via a second contact tip of the welding torch; an electrode preheating control circuit configured to adjust at least one of the preheating current or an electrode feed speed based on the change in the contact-tip-to-work-distance; and a current interpreter configured to determine a change in a contact-tip-to-work-distance of the welding torch based on at least one of the welding-type current or the preheating current.

20 Claims, 15 Drawing Sheets

(51) Int. Cl.
    *B23K 9/12*     (2006.01)
    *B23K 9/173*    (2006.01)

(56) References Cited

U.S. PATENT DOCUMENTS

| | | | |
|---|---|---|---|
| 3,912,980 | A | 10/1975 | Crump |
| 4,384,187 | A | 5/1983 | Jackson |
| 4,590,358 | A | 5/1986 | Stol |
| 4,614,856 | A | 9/1986 | Hori |
| 4,675,494 | A | 6/1987 | Dilay |
| 5,521,355 | A | 5/1996 | Lorentzen |
| 5,760,373 | A | 6/1998 | Colling |
| 5,994,659 | A | 11/1999 | Offer |
| 6,259,059 | B1 * | 7/2001 | Hsu ............... B23K 9/092 219/130.51 |
| 7,663,074 | B2 | 2/2010 | Wells |
| 9,162,312 | B2 | 10/2015 | Ma |
| 9,227,262 | B2 | 1/2016 | Wiryadinata |
| 9,233,432 | B2 | 1/2016 | Zhang |
| 9,463,523 | B2 | 10/2016 | Roth |
| 9,862,050 | B2 | 1/2018 | Cole |
| 2005/0082268 | A1 | 4/2005 | Lajoie |
| 2006/0138115 | A1 | 6/2006 | Norrish |
| 2006/0163227 | A1 | 7/2006 | Hillen |
| 2008/0053978 | A1 | 3/2008 | Peters |
| 2013/0213942 | A1 | 8/2013 | Peters |
| 2014/0131339 | A1 | 5/2014 | Fischer |
| 2014/0366721 | A1 | 12/2014 | Roy |
| 2015/0014283 | A1 * | 1/2015 | Peters ............... B23K 26/32 219/74 |
| 2015/0213921 | A1 | 7/2015 | Koide |
| 2016/0074973 | A1 | 3/2016 | Kachline |
| 2016/0221105 | A1 * | 8/2016 | Henry ............... B23K 9/124 |
| 2017/0008116 | A1 * | 1/2017 | Siewert ............. B23K 9/296 |
| 2017/0165778 | A1 | 6/2017 | Hsu |
| 2017/0225255 | A1 | 8/2017 | Zwayer |
| 2018/0333798 | A1 | 11/2018 | Lee |
| 2018/0354052 | A1 | 12/2018 | Schartner |
| 2018/0354075 | A1 | 12/2018 | Liu |

FOREIGN PATENT DOCUMENTS

| | | |
|---|---|---|
| CA | 2883947 | 3/2014 |
| CN | 1031342 | 3/1989 |
| CN | 2125475 | 12/1992 |
| CN | 1102480 | 5/1995 |
| CN | 2215372 | 12/1995 |
| CN | 1191790 | 9/1998 |
| CN | 1220626 | 6/1999 |
| CN | 1665633 | 9/2005 |
| CN | 101360580 | 2/2009 |
| CN | 102059476 | 5/2011 |
| CN | 102126077 | 7/2011 |
| CN | 102649202 | 8/2012 |
| CN | 103624378 | 3/2014 |
| CN | 104043895 | 9/2014 |
| CN | 104263897 | 1/2015 |
| CN | 104508161 | 4/2015 |
| CN | 104511680 | 4/2015 |
| CN | 104968465 | 10/2015 |
| CN | 105246634 | 1/2016 |
| CN | 105377493 | 3/2016 |
| DE | 2228701 | 12/1972 |
| EP | 0150543 | 8/1985 |
| EP | 0204559 | 12/1986 |
| EP | 0936019 | 8/1999 |
| EP | 0936019 A2 | 8/1999 |
| EP | 0936019 A3 | 3/2001 |
| EP | 2522453 | 11/2012 |
| EP | 2892680 | 7/2015 |
| JP | S5874278 | 5/1983 |
| JP | S58110195 | 6/1983 |
| JP | S61186172 | 8/1986 |
| JP | S629773 | 1/1987 |
| JP | S6297773 | 5/1987 |
| JP | H1097327 | 4/1998 |
| JP | 2003205385 | 7/2003 |
| KR | 20100120562 | 11/2010 |
| WO | 0075634 | 12/2000 |
| WO | 2005030422 | 4/2005 |
| WO | 2014140783 | 9/2014 |
| WO | 2014155180 | 10/2014 |
| WO | 2015124977 | 8/2015 |

OTHER PUBLICATIONS

N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.

Int'l Search Report and Written Opinion for PCT/US2018/036898 dated Oct. 1, 2018 (14 pgs.).

Int'l Search Report and Written Opinion for PCT/US2018/036900 dated Oct. 5, 2018 (15 pgs.).

Int'l Search Report and Written Opinion for PCT/US2018/049888 dated Feb. 1, 2019 (14 pgs.).

Int'l Search Report and Written Opinion for PCT/US2018/052384 dated Feb. 12, 2019 (12 pgs.).

Non-Final Office Action U.S. Appl. No. 15/343,992 dated Mar. 7, 2019 (18 pgs.).

Canadian Office Action Appln No. 3,005,408 dated Mar. 19, 2019.

Pitrun, "The effect of welding parameters on levels of diffusible hydrogen in weld metal deposited using gas shield rutile flux cored wires," Published in 2004.

Gupta, "A low temperature hydrogen sensor based on palladium nanoparticles," Published in 2014.

Lincoln Electric, "Storing and Redrying Electrodes," Published in 2011.

Non-Final Office Action U.S. Appl. No. 15/498,249 dated Sep. 23, 2019 (43 pgs).

Int'l Search Report and Written Opinion Appln No. PCT/US2019/050972, dated Nov. 14, 2019, (13 pgs).

Int'l Search Report and Written Opinion Appln No. PCT/U2019/049109 dated Dec. 2, 2019 (11 pgs).

PCT, IPRP, issued in connection with PCT/US2018/036898, dated Dec. 19, 2019, 7 pages.

PCT, IPRP, issued in connection with PCT/US2018/036900, dated Dec. 19, 2019, 7 pages.

European Office Action Appln No. 20164462.2 dated Sep. 7, 2020.
European Office Action Appln No. 18735144.0 dated Dec. 18, 2020.
European Office Action Appln No. 18735144.0 dated Dec. 21, 2020.
European Office Action Appln No. 18735143.2 dated Mar. 24, 2021.
Canadian Office Action Appln. No. 3,066,677 dated Mar. 16, 2021.
Canadian Office Action Appln. No. 3,066,619 dated Mar. 31, 2021.
Canadian Office Action Appln. No. 3,066,740 dated Apr. 15, 2021.
Canadian Office Action Appln. No. 3,066,731 dated Apr. 14, 2021.
Mohamed Cad-el-Hak, "MEMB Design and Fabrication" translated by Haixia Zhang, et al., Feb. 28, 2010, pp. 458-459.

Int'l Search Report and Written Opinion for PCT/US2018/035087 dated Sep. 19, 2018 (15 pgs.).

* cited by examiner

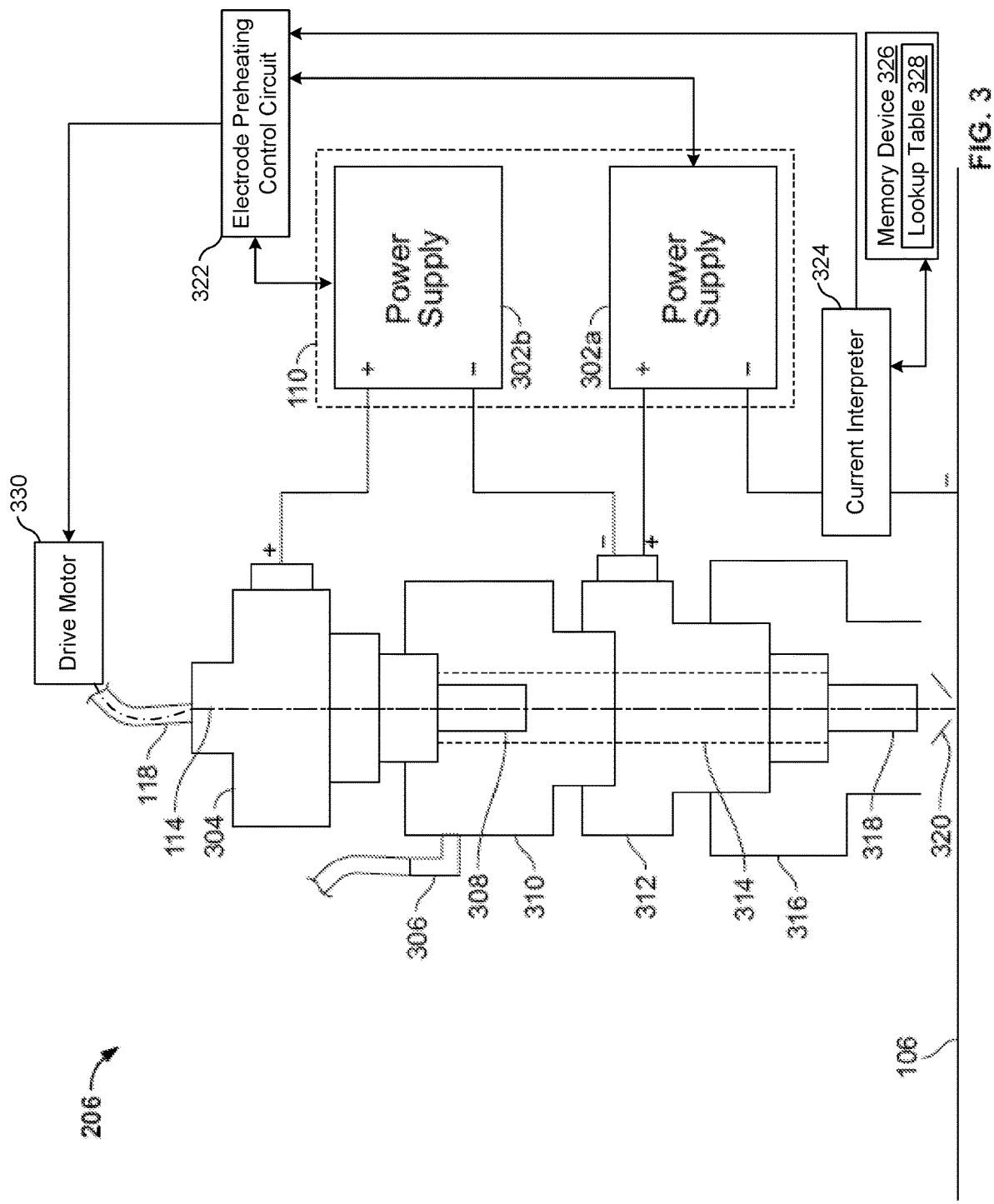

SYSTEMS, METHODS, AND APPARATUS TO CONTROL WELDING ELECTRODE PREHEATING

BACKGROUND

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

This disclosure relates generally to welding and, more particularly, to systems, methods, and apparatus to control welding electrode preheating.

BRIEF DESCRIPTION OF THE DRAWINGS

FIG. 3 illustrates a functional diagram of an exemplary contact tip assembly.

The figures are not to scale. Where appropriate, the same or similar reference numerals are used in the figures to refer to similar or identical elements.

DETAILED DESCRIPTION

Figure 1:
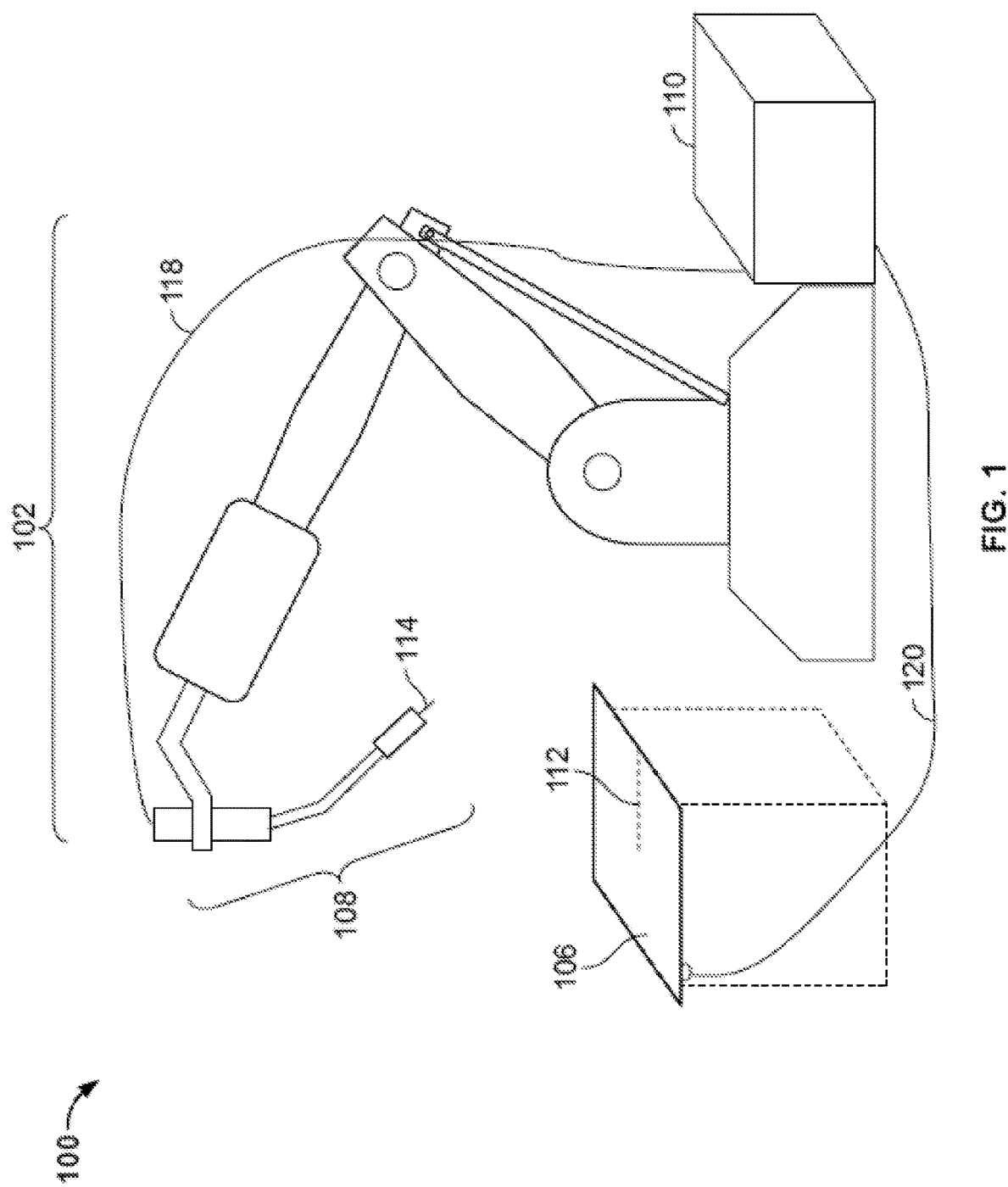
FIG. 1 illustrates an example robotic welding system.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the term "embodiments" does not require that all embodiments of the disclosure include the discussed feature, advantage, or mode of operation.

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire. As used herein, the term "preheat voltage" refers to a measured voltage representative of the voltage across a section of electrode conducting preheating current, but not necessarily the exact voltage across that section.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current.

Instead, these electric currents may be conducted in either direction or have either polarity for a given circuit, even if an example current polarity or direction is provided or illustrated.

Disclosed example consumable electrode-fed welding-type systems include a welding-type current source, an electrode preheating circuit, a current interpreter, and an electrode preheating control circuit. The welding-type current source provides welding-type current to a welding-type circuit, where the welding-type circuit includes a welding-type electrode and a first contact tip of a welding torch. The electrode preheating circuit provides preheating current through a first portion of the welding-type electrode via a second contact tip of the welding torch. The current interpreter determines a change in a contact-tip-to-work-distance of the welding torch based on at least one of the welding-type current or the preheating current. The electrode preheating control circuit configured to adjust at least one of the preheating current or an electrode feed speed based on the change in the contact-tip-to-work-distance.

In some examples, the current interpreter detects the change in the contact-tip-to-work-distance by: measuring the preheating current; determining the contact-tip-to-work-distance based on the measurement of the preheating current; identifying a change in the at least one of the welding-type current or the preheating current; and determining the change in the contact-tip-to-work-distance based on the change in the at least one of the welding-type current or the preheating current.

In some examples, the current interpreter measures the preheating current by measuring a first average preheating current over a first time period. In some such examples, the current interpreter identifies the change in the preheating current by identifying a difference between 1) a second average preheating current over a second time period and 2) the first average preheating current. In some examples, the current interpreter determines the contact-tip-to-work-distance based on the preheating current by looking up the preheating current in a table associating preheating current values with contact-tip-to-work-distances. In some such examples, the current interpreter determines the contact-tip-to-work-distance based on the preheating current by looking up at least one of a welding setpoint voltage, the welding-type current, a heat input, or a resistance in the welding-type circuit.

In some example systems, the current interpreter includes a current sensor, where the system further includes a memory device to store a plurality of preheating current measurement values associated with corresponding contact-tip-to-work-distances. In some examples, the welding-type current source executes a voltage-controlled control loop to provide the welding-type current. In some such examples, the electrode preheating control circuit controls the preheating current to maintain the welding-type current within a current range and to maintain a heat input within a heat input range.

In some example systems, the electrode preheating control circuit adjusts the preheating current to maintain a substantially constant heat input into a workpiece. In some examples, the first contact tip conducts the preheating current, where the first portion of the welding-type electrode is between the first and second contact tips of the welding torch.

Disclosed example methods include providing welding-type current using a welding-type current source to a welding-type circuit, where the welding-type circuit includes a welding-type electrode and a first contact tip of a welding torch; providing preheating current through a first portion of the welding-type electrode via a second contact tip of the welding torch; and adjusting at least one of the preheating current or an electrode feed speed based on a change in a contact-tip-to-work-distance or a stickout length.

In some example methods, determining the change involves measuring the preheating current, determining the at least one of the contact-tip-to-work-distance or the stickout length based on the measurement of the preheating current, identifying a change in the at least one of the welding-type current or the preheating current, and determining a change in the at least one of the contact-tip-to-work-distance of the welding torch or the stickout length based on the change in the at least one of the welding-type current or the preheating current. In some examples, adjusting the at least one of the preheating current or the electrode feed speed involves maintaining a substantially constant heat input into a workpiece.

In some example methods, determining the change involves looking up a change in the preheating current in a lookup table stored in a memory device. Some example methods further involve determining the change in at least one of the contact-tip-to-work-distance of the welding torch or the stickout length of the welding-type electrode. In some such examples, determining the change in at least one of the contact-tip-to-work-distance of the welding torch or the stickout length involves looking up at least one of the preheating current or the welding-type current in a lookup table. In some examples, determining the change in at least one of the contact-tip-to-work-distance of the welding torch or the stickout length comprises looking up at least one of a resistance of the welding-type circuit, an enthalpy, a heat input, or a welding-type voltage setpoint in a lookup table. In some example methods, adjusting the preheating current or the electrode feed speed involves controlling the preheating current or the electrode feed speed to maintain a target arc length.

Some disclosed consumable electrode-fed welding-type system includes a welding-type current source to provide welding-type current to a welding-type circuit, where the welding-type circuit includes a welding-type electrode and a first contact tip of a welding torch. The system further includes an electrode preheating circuit to provide preheating current through a first portion of the welding-type electrode via a second contact tip of the welding torch, and a control circuit to maintain a substantially constant heat input into a weld by adjusting at least one of the preheating current or an electrode feed speed based on monitoring a combination of the preheating current and the welding-type current as a proxy for contact-tip-to-work-distance.

Referring to FIG. 1, an example welding system 100 is shown in which a robot 102 is used to weld a workpiece 106 using a welding tool 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shield gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser (e.g., laser welding, laser cladding, laser hybrid), sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may preheat the wire into a pool with an arc between the wire and the pool. Optionally, in any embodiment, the welding equipment 110 may be arc welding equipment having one or more power supplies, and associated circuitry, that provides a direct current (DC), alternating current (AC), or a combination thereof to an electrode wire 114 of a welding tool (e.g., welding tool 108). The welding tool 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

As will be discussed below, the welding tool 108 may employ a contact tip assembly 206 that heats the electrode wire 114 prior to forming a welding arc 320 using the electrode wire 114. Suitable electrode wire 114 types includes, for example, tubular wire, metal cored wire, aluminum wire, solid gas metal arc welding (GMAW) wire, composite GMAW wire, gas-shielded FCAW wire, SAW wire, self-shielded wire, etc. In one aspect, the electrode wire 114 may employ a combination of tubular wire and reverse polarity current, which increases the metal transfer stability by changing it from globular transfer to a streaming spray. By preheating prior to wire exiting the first tip and fed in the arc (where the material transfer takes place), the tubular electrode wire 114 acts more like a solid wire in that the material transfer is a more uniform spray or streaming spray. Moreover, there is a reduction in out-gassing events and very fine spatter-causing events, which are commonly seen while welding with metal core wire. Such a configuration enables the tubular wire to function in a manner similar to a solid wire type streaming spray. Yet another benefit of preheating is alleviating wire flip due to poor wire cast and helix control in wire manufacturing (which may be more pronounced in tubular wire than solid wire) because the undesired wire twist will be reduced in the preheating section.

Figure 2A:
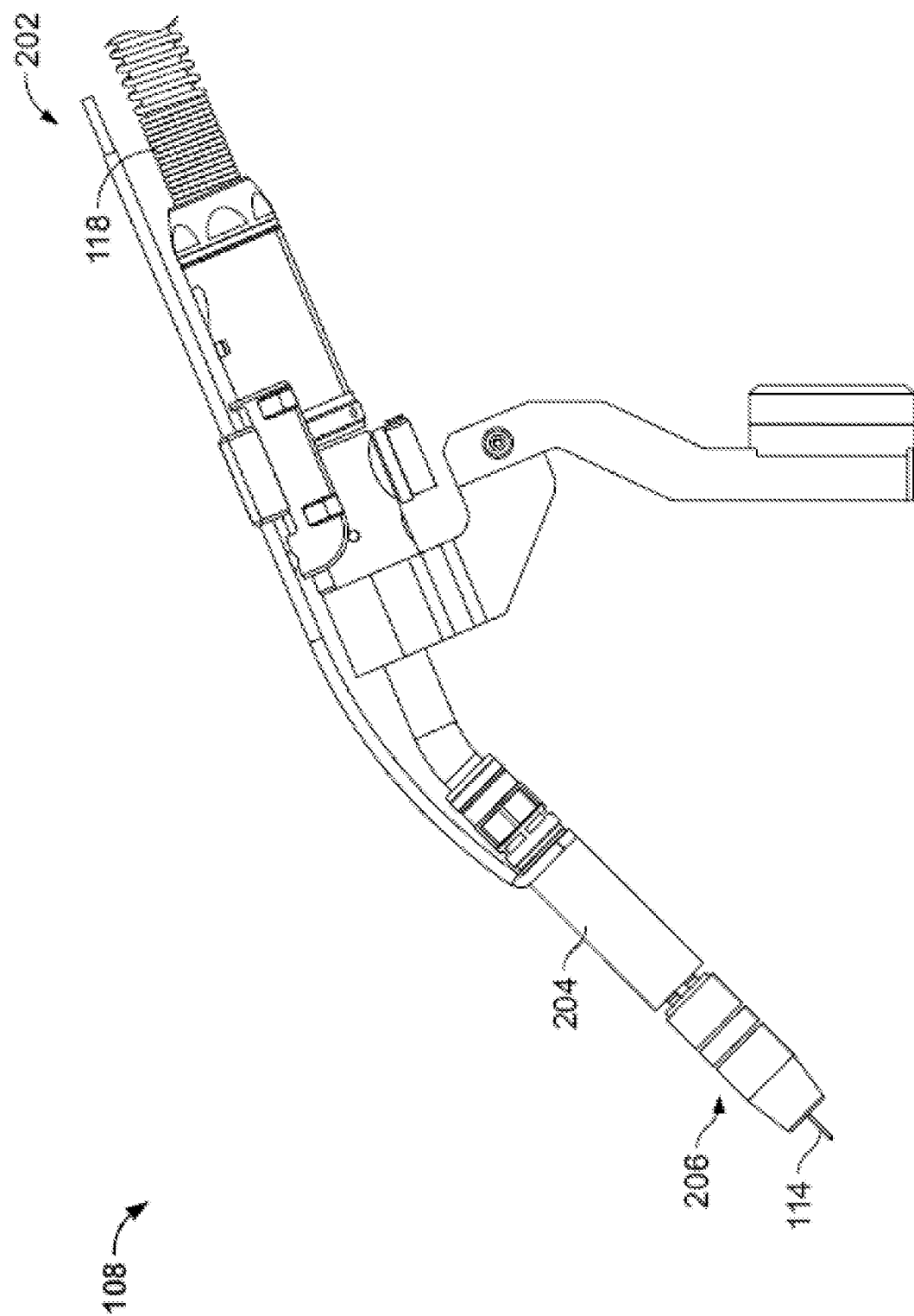
FIG. 2a illustrates a side view of an example robotic gooseneck welding torch with an air cooled preheater section.
Figure 2B:
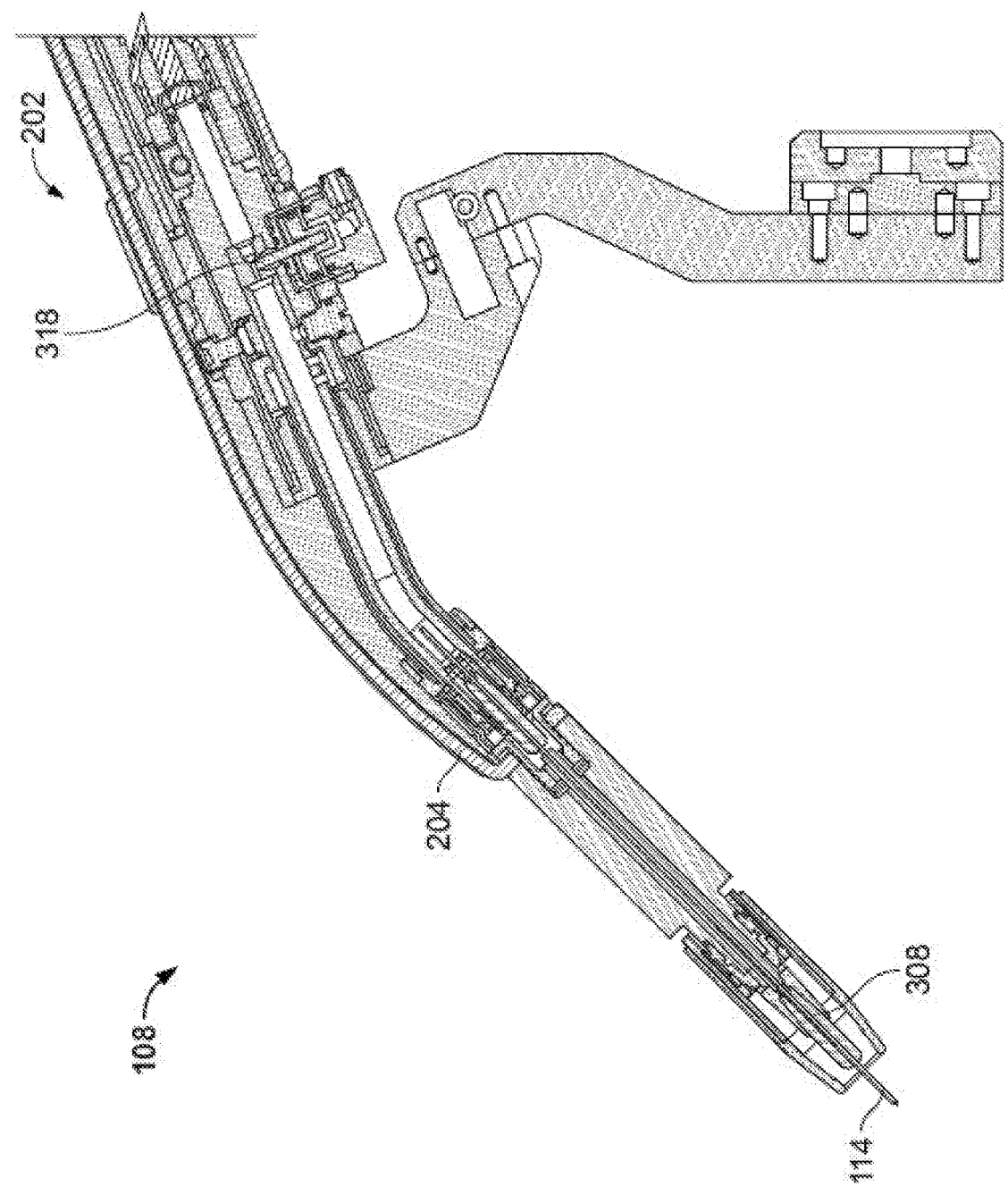
FIG. 2b illustrates a cross sectional side view of an example robotic gooseneck welding torch with an air cooled preheater section.
Figure 2C:
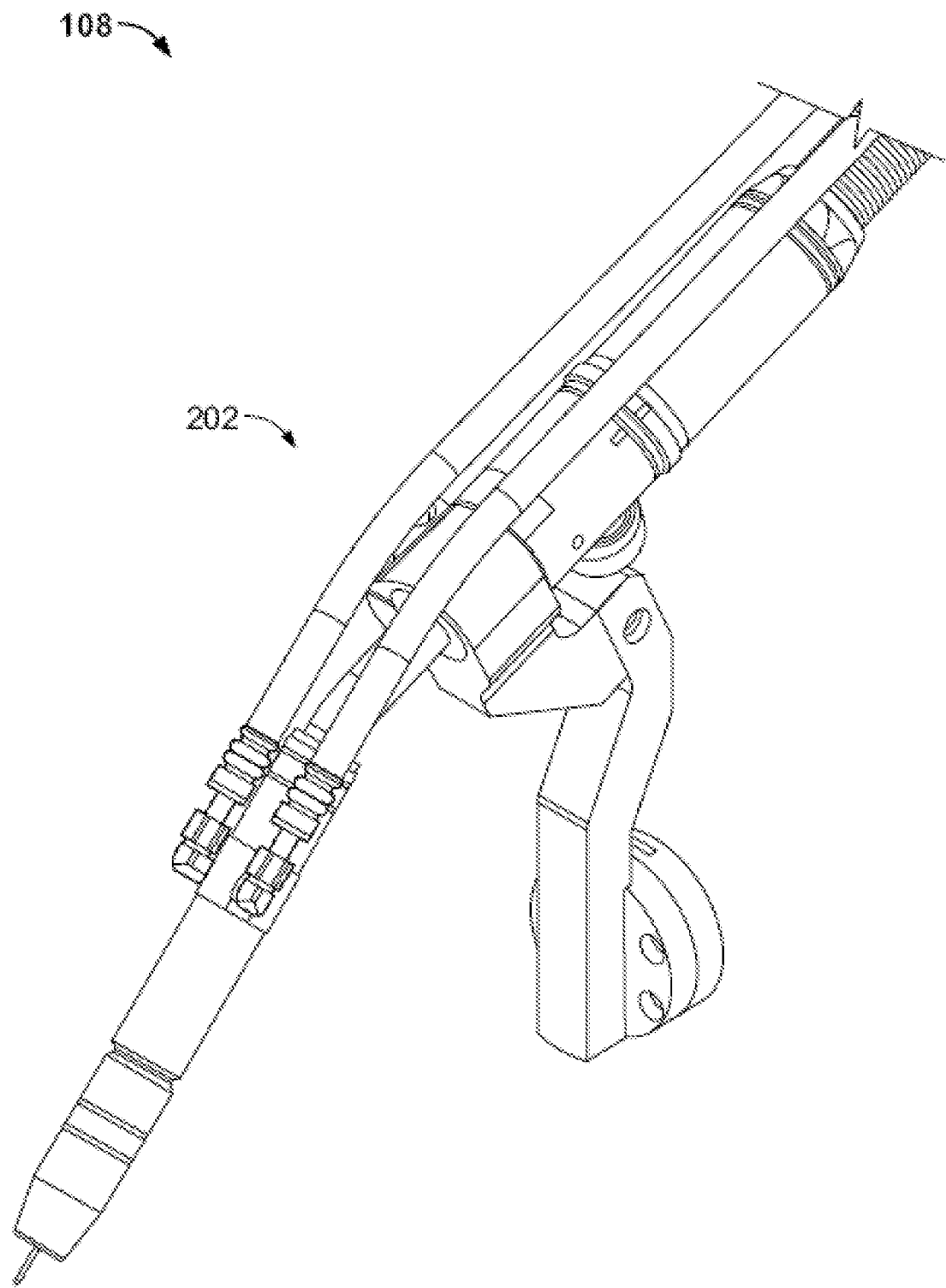
FIG. 2c illustrates a perspective view of an example robotic gooseneck welding torch with liquid cooled weld cables.
Figure 2D:
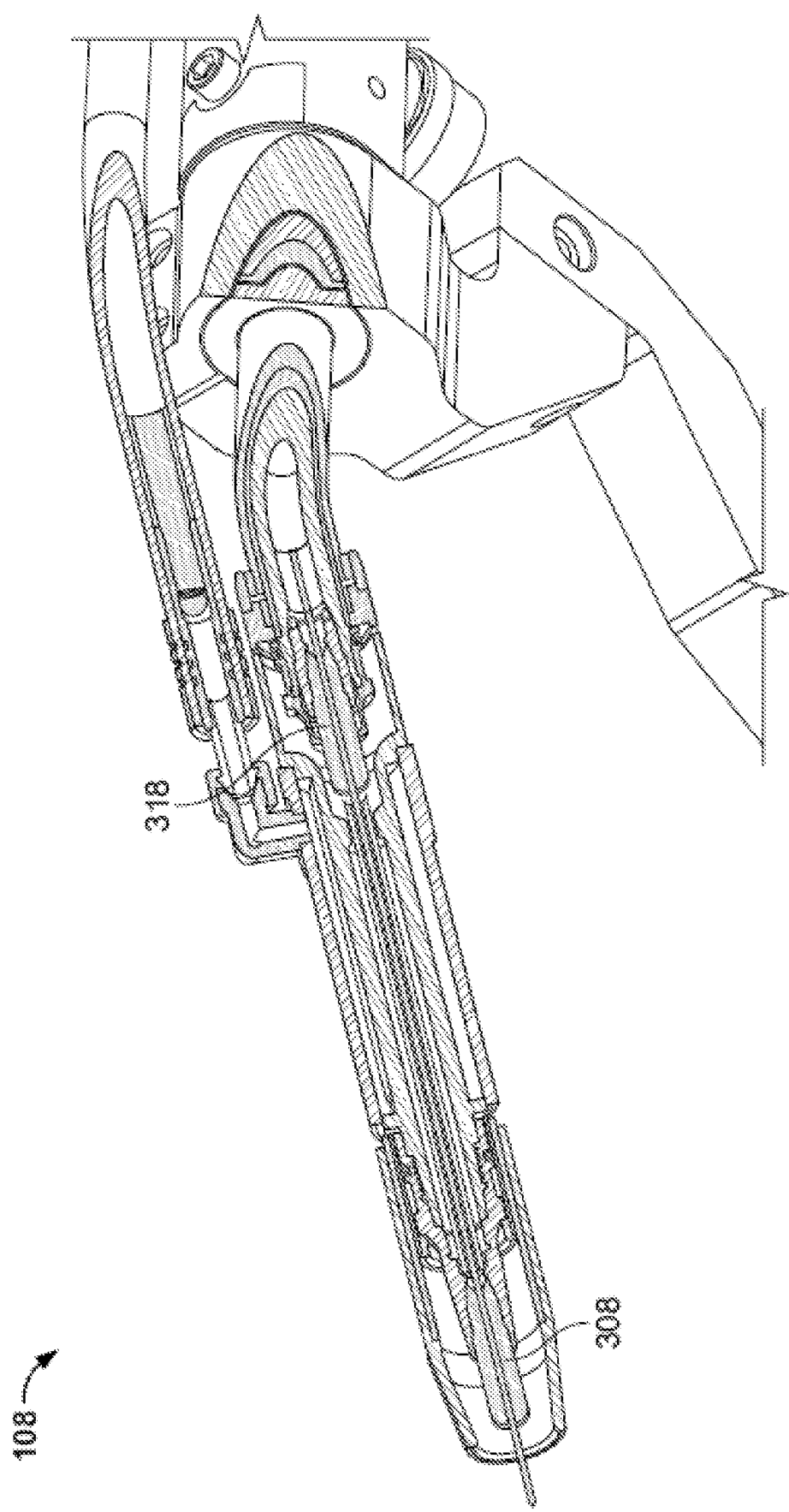
FIG. 2d illustrates a cross sectional perspective view of an example robotic gooseneck welding torch with liquid cooled weld cables.

As will be discussed with regard to FIG. 2a through 2d, the welding tool 108 may be a gooseneck torch, such as those used with robotic welding, but other shapes are contemplated, including virtually any neck bend angle greater than zero, handheld versions for low hydrogen FCAW welding, handhelds for GMAW, straight-neck hard automation torches, straight-neck SAW torches, etc. FIG. 2a illustrates a side view of an example robotic gooseneck welding torch with an air cooled preheater section. FIG. 2b illustrates a cross sectional side view of an example robotic gooseneck welding torch with an air cooled preheater section. FIG. 2c illustrates a perspective view of an example robotic gooseneck welding torch with liquid cooled weld cables. FIG. 2d illustrates a cross sectional perspective view of an example robotic gooseneck welding torch with liquid cooled weld cables, where the copper conductor partially shown. In certain aspects, a plurality of ceramic guides or rollers may be used to provide a preheater with a bend in it, which might have contact advantages with the contact tips and allow for unique form factors. In other aspects, the neck may be straight and the robot mounting bracket has the bend.

There are, however, a number of advantages to the gooseneck torch design. The gooseneck torch design, for example, allows for better access to the weld joint 112, as well as automation capabilities in heavy equipment applications. The gooseneck torch design also allows for heavier deposition welding in tighter spaces compared to, for example, a tandem torch design. Thus, in operation, the electrode wire 114 delivers the welding current to the point of welding (e.g., the weld joint 112) on the workpiece 106 (e.g., a weldment) to form a welding arc 320.

In the welding system 100, the robot 102, which is operatively coupled to welding equipment 110 via conduit 118 and ground conduit 120, controls the location of the welding tool 108 and operation of the electrode wire 114 (e.g., via a wire feeder) by manipulating the welding tool 108 and triggering the starting and stopping of the current flow (whether a preheating current and/or welding current) to the electrode wire 114 by sending, for example, a trigger signal to the welding equipment 110. When welding current is flowing, a welding arc 320 is developed between the electrode wire 114 and the workpiece 106, which ultimately produces a weldment. The conduit 118 and the electrode wire 114 thus deliver welding current and voltage sufficient to create the welding arc 320 between the electrode wire 114 and the workpiece 106. At the point of welding between the electrode wire 114 and the workpiece 106, the welding arc 320 locally melts the workpiece 106 and electrode wire 114 supplied to the weld joint 112, thereby forming a weld joint 112 when the metal cools.

In certain aspects, in lieu of a robot 102's robotic arm, a human operator may control the location and operation of the electrode wire 114. For example, an operator wearing welding headwear and welding a workpiece 106 using a handheld torch to which power is delivered by welding equipment 110 via conduit 118. In operation, as with the system 100 of FIG. 1, an electrode wire 114 delivers the current to the point of welding on the workpiece 106 (e.g., a weldment). The operator, however, could control the location and operation of the electrode wire 114 by manipulating the handheld torch and triggering the starting and stopping of the current flow via, for example, a trigger. A handheld torch generally comprises a handle, a trigger, a conductor tube, a nozzle at the distal end of the conductor tube, and, as disclosed herein, a contact tip assembly 206. Applying pressure to the trigger (i.e., actuating the trigger) initiates the welding process by sending a trigger signal to the welding equipment 110, whereby welding current is provided, and the wire feeder is activated as needed (e.g., to drive the electrode wire 114 forward to feed the electrode wire 114 and in reverse to retract the electrode wire 114). Commonly owned U.S. Pat. No. 6,858,818 to Craig S. Knoener, for example, describes an example system and method of controlling a wire feeder of a welding-type system. The subject disclosure may be practiced together with spin arc and reciprocating wire feed. In one example, the bottom tip may be moved to cause a preheated wire to spin. In another example, the wire may be moved axially forward and backward prior to being preheated by a reverse wire feed motor upstream. Both spin and reverse wire feed on its own may have a positive effect in wire melt off rate and deposition. When they are combined, the effect on deposition rate may be compounded.

FIG. 2A illustrates a perspective view of an example robotic gooseneck welding torch 108. The illustrated gooseneck torch 108 generally includes a torch body 202, a gooseneck 204 extending from a forward end of the torch body 202, and a contact tip assembly 206 at a distal end of the gooseneck 204, or through the radius of the gooseneck 204. The conduit 118 of the welding system 100 operably couples to a rear end of the torch body 202, which is further operably coupled to the robot 102 and welding equipment 110. The conduit 118 supplies, inter alia, electrical current, shielding gas, and a consumable electrode (e.g., electrode wire 114) to the torch body 202. The electrical current, shielding gas, and consumable electrode travel through the torch body 202 to the gooseneck 204 and ultimately exit through an orifice at the distal end of the contact tip assembly 206 where a welding arc 320 is ultimately formed. In certain aspects, gooseneck torch 108 may be fluid cooled, such as air-cooled and/or liquid-cooled (e.g., water-cooled). In one embodiment, the liquid cooling mechanism surrounds the preheat contact tips and transfers away extra heat from the preheater inside the torch body.

To facilitate maintenance, the gooseneck torch 108 may be configured with interchangeable parts and consumables. For example, the gooseneck torch 108 may include a quick change add-on and/or a second contact tip that allows adaptation of an existing water cooled/air cooled torch. Commonly owned U.S. Patent Publication No. 2010/0012637, for example, discloses a suitable gooseneck locking mechanism for a robotic torch having a torch body and a gooseneck that includes a connector receiver disposed in the torch body.

The packaging of power source for preheat can take one of a variety of forms. In a preferred aspect, the preheat power supply may be integral with the welding power supply, or inside the same housing. Inside the same box, the preheat power supply can be an auxiliary power supply with its own separate transformer feeding from the mains; however, it is also possible for the preheat power supply to share the same primary and transformer for welding current by feeding off a dedicated secondary winding. An integrated box provides simplicity in inter-connection, installation and service. Another embodiment is that the preheat power supply is separately packaged in its own housing with benefit of retrofitting into existing installations and to permit a "mix-and-match" flexibility in pairing with other power sources, such as for those suitable for open arc welding and sub-arc welding. Separate packaging also requires communications between the controller inside the welding power source and the preheating power source. Communication may be provided through digital networking, or more specifically industrial serial bus, CANbus, or Ethernet/IP. Separate packaging may also result in combining the power output of preheat power source and the output of the welding power source, possibly in the feeder, or in a junction box before the torch, or in the torch itself.

In open arc welding, there are two derivatives, high deposition welding commonly seen in shipbuilding and heavy equipment fabrication (commonly groove, butt and fillet joint, 15-40 ipm travel speed); and high speed welding commonly seen in automotive (commonly lap joint, 70-120 ipm travel speed). Wire preheating improves deposition and/or travel speed in both cases. In open arc, GMAW with solid or metal core wire may be used; or FCAW with fluxed cored wire may be used as a process. In sub-arc welding, solid or metal core wire may be used. In both open arc and sub-arc, multiple wire and/or arc combinations are possible. For example, the lead wire has preheat and arc, but the trail wire has only preheat but no arc. Another example is that both lead wire and trail wire has preheat and arc. Yet another example is that there are 3 wires, where the first and third wire has both preheat and arc, but the middle wire has preheat only but no arc. There are many permutations possible. The third group of applications is resistive preheating with another non-consumable heat source such as laser, plasma, or TIG, for welding, brazing, cladding, and hardfacing. The wire is preheated by resistive preheat and fed into a liquid puddle melted by laser, plasma, or TIG.

In some examples, the second contact tip (e.g., further from the arc) is a spring loaded, one-size-fits-all contact tip. The spring pressure in the second contact tip improves electrical contact despite electrical erosion and/or mechanical wear on the contact tip. Conventional spring loaded contact tips are relatively expensive and are easily damaged by exposure to the arc and/or burn-back. However, using the spring loaded second contact tip that is not exposed to the arc and is not exposed to burn-back improves the longevity of the spring loaded contact tip. Because the torch accommodates different wire sizes, and a multi-size or universal second tip improves convenience to the weld operator by reducing the number of tips to be matched to the wire diameter, (e.g., the first contact tip). The construction of the spring-loaded contact tip may be one piece (e.g., a tubular structure with slots so that the tines are adaptive to different wire diameter and apply pressure and reliable contact) or two or more pieces. For weld operators who are accustomed to conventional guns and only having a single contact tip (e.g., the tip closer to the arc), the weld operator is rarely or never required to replace the second contact tip, thereby improving the weld operator experience using multiple contact tips.

FIG. 3 illustrates a functional diagram of an exemplary contact tip assembly 206, which may be used with welding system 100, whether robotic or manually operated. As illustrated, the contact tip assembly 206 may comprise a first body portion 304, a gas shielding inlet 306, a first contact tip 318, a second body portion 310, a third body portion 312, a ceramic guide 314, a gas nozzle 316, and a second contact tip 308. While the first, second, and third body portions 304, 310, 312 are illustrated as separate components, one of skill in the art, having reviewed the present disclosure, would recognize that one or more of said body portions 304, 310, 312 may be fabricated as a single component. In certain aspects, the contact tip assembly 206 may be added to an existing welding torch. For example, the contact tip assembly 206 can be attached to a distal end of a standard welding setup and then used for resistive preheating. Similarly, the contact tip assembly 206 may be provided as a PLC retrofit with custom software, thereby enabling integration with existing systems that already have power sources and feeders.

In some examples, the first contact tip 318 and/or the second contact tip 308 are modular and/or removable so as to be easily serviceable by a user of the welding system 100. For example, the first contact tip 318 and/or the second contact tip 308 may be implemented as replaceable cartridges. In some examples, the welding equipment 110 monitors identifies one or more indicators that the first contact tip 318 and/or the second contact tip 308 should be replaced, such as measurements of the used time of the first contact tip 318 and/or the second contact tip 308, temperature(s) of the first contact tip 318 and/or the second contact tip 308, amperage in the first contact tip 318 and/or the second contact tip 308 and/or the wire, voltage between the first contact tip 318 and/or the second contact tip 308 and/or the wire, enthalpy in the wire, and/or any other data.

In operation, the electrode wire 114 passes from the gooseneck 204 through a first contact tip 318 and a second contact tip 308, between which a second power supply 302b generates a preheating current to heat the electrode wire 114.

Specifically, the preheating current enters the electrode wire 114 via the second contact tip 308 and exits via the first contact tip 318. At the first contact tip 318, a welding current may also enter the electrode wire 114. The welding current is generated, or otherwise provided by, a first power supply 302a. The welding current exits the electrode wire 114 via the workpiece 106, which in turn generates the welding arc 320. That is, the electrode wire 114, when energized for welding via a welding current, carries a high electrical potential. When the electrode wire 114 makes contact with a target metal workpiece 106, an electrical circuit is completed and the welding current flows through the electrode wire 114, across the metal work piece(s) 106, and to ground. The welding current causes the electrode wire 114 and the parent metal of the work piece(s) 106 in contact with the electrode wire 114 to melt, thereby joining the work pieces as the melt solidifies. By preheating the electrode wire 114, a welding arc 320 may be generated with drastically reduced arc energy. The preheating current can range from, for example, 75 A to 400 A, when the distance between contact tips is 5.5 inches. Generally speaking, the preheating current is proportional to the distance between the two contact tips and the electrode wire 114 size. That is, the smaller the distance, the more current needed. The preheating current may flow in either direction between the electrodes.

The welding current is generated, or otherwise provided by, a first power supply 302a, while the preheating current is generated, or otherwise provided by, a second power supply 302b. The first power supply 302a and the second power supply 302b may ultimately share a common power source (e.g., a common generator or line current connection), but the current from the common power source is converted, inverted, and/or regulated to yield the two separate currents—the preheating current and the welding current. For instance, the preheat operation may be facilitated with a single power source and associated converter circuitry, in which case three leads may extend from the welding equipment 110 or an auxiliary power line in the welder, which could eliminate the need for the second power supply 302b.

The example power supplies 302a, 302b of FIG. 3 are controlled by an electrode preheat control circuit 322. based at least in part on feedback from a current interpreter 324. For example, the electrode preheating control circuit 322 adjusts at least one of the preheating current (e.g., output by the power supply 302b) or an electrode feed speed (e.g., controlled by a drive motor 330) based on the change in the contact-tip-to-work-distance (CTWD). The drive motor 330 drives the electrode wire 114 from a source (e.g., a wire reel) through the contact tips 308, 318 toward the workpiece 106. The example electrode preheating control circuit 322 may control the speed of the drive motor 330 to control a feed speed of the electrode wire 114.

The example current interpreter 324 includes a current sensor to obtain measurements of the welding-type current output by the power supply 302a. To this end, the example current interpreter 324 may be coupled to either of the positive or negative output terminals of the power supply 302a. The example power supply 302a is configured to execute a voltage-controlled control loop to provide the welding-type current.

In addition to preheating of the electrode wire 114 by the power supply 302b and the contact tips 308 and 318, the electrode wire 114 may also incur "stickout heating." As used herein, the term "stickout heating" refers to the resistive heating that occurs by conduction of the weld current through the stickout portion of the electrode wire 114 located between the contact tip 318 and the welding arc 320. For a given current, stickout heating increases as the stickout length increases and decreases as the stickout length decreases. As used herein, the term "stickout length" refers to the length of the electrode wire 114 extending from the contact tip 318 (e.g., the length of the electrode wire 114 between the contact tip and the welding arc 320). The CTWD is the sum of the stickout length and the arc length.

As described in more detail below, the electrode preheating control circuit 322 is operable to control the preheating power supplied by the power supply 302b to maintain a substantially constant heat input to a weld (e.g., a heat input within a range). In some examples, the electrode preheating control circuit 322 controls the preheating power based on estimating the stickout heating of the electrode 114 and by modifying the preheating power provided by the power supply 302b based on changes in the estimated stickout heating.

For a given wire type, wire size, wire feed speed, and gas type, the average welding type current and average preheating current are stored in the lookup table(s) 328 and represent values at a predetermined CTWD. Any deviation from these table values reflects a change in the CTWD from the predetermined CTWD. In an example of operation, in a voltage-controlled weld process, as the CTWD gets shorter, the welding-type current increases to maintain the desired weld voltage (e.g., by reducing the wire stickout and increasing the arc length) and, as a result, causes the measured average weld current to increase. If the measured average weld current exceeds a threshold range of the lookup table corresponding to the predetermined CTWD, a preheat control loop (e.g., another voltage-controlled loop, a current-controlled loop controlled to maintain the average weld current to within a range of the table value for the given wire feed speed) increases the electrode preheating current, which causes the welding-type current to decrease towards the desired average weld current/heat input. Conversely, if the CTWD increases, the welding-type current will decrease and causes the average welding type current to decrease. If the average welding-type current falls below the threshold range of the lookup table corresponding to the predetermined CTWD, the preheat control loop will decrease the preheating current, which in turn causes an increase in the welding-type current.

After the preheating current is corrected, the welding-type current and heat input have returned to the target or setpoint levels. Because the welding-type current is controlled based on the amount of preheating current to maintain the target heat input, a different CTWD is now reflected by a change in the preheating current the prior value that corresponds to the prior CTWD in the lookup table(s) 328. For example, a reduction in CTWD results in an increase in preheating current and an increase in CTWD results in a reduction in the preheating current, while the steady state welding-type current, welding-type voltage, and heat input remain the same as with the prior CTWD. In other words, a change in CTWD results in a change of the welding-type current in a constant voltage weld process. The preheat control loop reacts to the change in the average welding-type current to control the preheating current and cause a change in the welding-type current in an effort to maintain the welding-type current and the welding-type voltage at setpoint values. The lookup table(s) 328 may indicate the CTWD based on the measured or commanded preheating and/or welding-type current amount and/or may be used to display the actual CTWD while welding.

The current interpreter 324 determines a change in a CTWD, an electrode stickout distance, and/or an arc length of the welding torch (e.g., the torch 108, the assembly 206) based on the welding-type current provided by the power supply 302a and/or a corresponding change in preheating current provided by the preheat power supply 302b. The current interpreter 324 may, for example, measure the preheating current provided by the power supply 302b and/or measure the welding-type current provided by the power supply 302a, determine the CTWD based on the measurement(s) of the preheating current and/or the welding-type current, identify change(s) in the preheating current and/or the welding-type current, and determine a change in the CTWD based on the change(s) in the preheating current and/or the welding-type current.

In some examples, the current interpreter 324 references a taught average current that stored in a memory device 326 (e.g., in a lookup table 328 stored in the memory device 326). The lookup table 328 includes a set of previously-observed currents associated with one or more of CTWD values, electrode stickout distances, and/or arc lengths. In some examples, the lookup table 328 associates the current values with stickout heating values and/or preheat compensation values to be used to control the preheat power supply 302b and/or an electrode feed speed.

To determine the associated values of welding-type current, preheating current, and preheat voltage, and CTWD values, electrode stickout distances, and/or arc lengths, preheating current (e.g., an average preheating current), and preheat voltage are measured from a measured or known CTWD. In a voltage-controlled (e.g., "constant voltage") welding process, the welding-type power supply 302a changes the welding-type current to maintain a set welding-type voltage, and the preheat power supply 302b changes the preheating current to maintain a constant heat input at the changed welding-type current level. A change in the CTWD causes a change in the measured voltage, causing the power supply 302a to respond with a change in the current to return (or maintain) the welding-type voltage to the setpoint value.

While the example current interpreter 324 compares changes in the preheating current (or average preheating current) to the lookup table(s) 328, the example current interpreter 324 may additionally or alternatively compare changes in the welding-type current and/or combinations of the welding-type current and the preheating current to corresponding values in the lookup table(s) 328. However, if the welding and/or preheat control loops are configured to return the welding-type current to a target value via changing the preheating current (as in the example above), determining changes in the CTWD via changes in the welding-type current (or the average welding-type current) may require that the example current interpreter 324 monitor transients in the welding-type current and/or the average welding-type current (e.g., slew rates).

The example current interpreter 324 of FIG. 3 monitors the preheating current (e.g., changes in the welding-type current) to determine a CTWD and to detect deviations from the CTWD during welding. For example, the electrode preheating control circuit 322 and/or the current interpreter 324 may determine a running average of the preheat current to determine an average CTWD and identify changes from the average CTWD based on changes in the welding-type current. The average CTWD may be taken over a first (e.g., running) time period, in which each new sample replaces the oldest sample for the purposes of calculating the running average. The current interpreter 324 may then compare the most recent current sample with the running average, and/or compare a second running average (e.g., a running average over a shorter time period) to the first running average.

Based on identifying changes in the CTWD, the example electrode preheating control circuit 322 controls the preheating power supply 302b to maintain a substantially constant heat input into the workpiece 106. For example, as CTWD, stickout, and/or arc length change, causing corresponding changes in the stickout heating, the electrode preheating control circuit 322 makes a corresponding adjustment to the amount of preheating of the electrode wire 114 performed prior to the electrode wire 114 being consumed in the weld puddle, to maintain the overall preheating of the electrode wire 114 (e.g., prior to consumption of the electrode wire 114 at the arc) at a substantially constant value. Because heat input can directly affect penetration, the example electrode preheating control circuit 322 may additionally or alternatively control adjustments made to the preheating of the electrode wire 114 to control the amount of weld penetration into the workpiece 106.

In some other examples, instead of determining the CTWD, the stickout length, and/or the arc length, the electrode preheat control circuit 322 determines a change in the stickout heating and/or determines a preheat adjustment from the lookup table(s) 328 stored in the memory device 326.

In still other examples, the electrode preheat control circuit 322 may access one or more stored relationships between the current values and CTWDs, stickout lengths, and/or arc lengths to determine the CTWD, the stickout length, and/or the arc length corresponding to a particular combination of preheating current and welding-type current (e.g., a current sample, an average current, etc.). For example, instead of storing values of CTWD, stickout length, and/or arc length corresponding to particular welding-type current values, the memory device 326 may store one or more algorithms or other relational data. The relationships may be determined by, for example, collection of similar data points for welding-type current, welding-type voltage, preheating current, preheating voltage, preheating power, preheating resistance, electrode preheat temperature, CTWD, stickout length, and/or arc length as for populating a lookup table, followed by performing regression analysis and/or other data processing to characterize the data into mathematical relationships. The example electrode preheat control circuit 322 populates the variables based on, for example, a voltage setpoint and an average welding-type current or a welding-type current sample to determine a corresponding CTWD, stickout length, and/or arc length.

To avoid unwanted kinking, buckling, or jamming of the electrode wire 114, a guide 314 may be provided to guide the electrode wire 114 as it travels from the second contact tip 308 to the first contact tip 318. The guide 314 may be fabricated from ceramic, a dielectric material, a glass-ceramic polycrystalline material, and/or another non-conductive material. The contact tip assembly 206 may further comprise a spring loaded device, or equivalent device, that reduces wire kinking, buckling, and jamming, while increasing wire contact efficiency by keeping the electrode wire 114 taught and/or straight.

In certain aspects, the second contact tip may be positioned at the wire feeder (e.g., at welding equipment 110) or another extended distance, to introduce the preheating current, in which case the preheating current may exit a contact tip in the gooseneck torch 108. The contact tip in the gooseneck torch 108 may be the same, or different, from the contact tip where the welding current is introduced to the electrode wire 114. The preheat contact tip(s) may be further positioned along the electrode wire 114 to facilitate use with Push-Pull Guns, such as those available from Miller Electric of Appleton, Wis. The liner could be made from ceramic rollers so the preheating current could be injected back at the feeder and be a very low value due to the length of the liner.

In certain aspects, in lieu of a distinct contact tip assembly 206, the first contact tip 318 and a second contact tip 308 may be positioned on each side of the gooseneck bend. For example, as illustrated by FIG. 2b, a preheat section may be curved (e.g., non-straight). That is, wire is fed through a section of the torch that has a bend greater than 0 degrees or a neck that would be considered a "gooseneck". The second contact tip 308 may be positioned before the initial bend and the first contact tip 318 after the bend is complete. Such an arrangement may add the benefit to the connectivity of the heated wire moving through the portion of the neck between the two contact tips. Such an arrangement results in a more reliable connection between the two contact tips where an off axis, machined dielectric insert was previously needed.

The preheating current and welding current may be DC, AC, or a combination thereof. For example, the welding current may be AC, while the preheating current may be DC, or vice versa. Similarly, the welding current may be DC electrode negative (DCEN) or a variety of other power schemes. In certain aspects, the welding current waveform may be further controlled, including constant voltage, constant current, and/or pulsed (e.g., AccuPulse). In certain aspects, constant current, constant impedance, constant power, constant penetration, and/or constant enthalpy may be used to facilitate preheat instead of constant voltage. For example, it may be desirable to control the amount of penetration into the workpiece. In certain aspects, there may be variations in contact tip to work distances that under constant voltage weld processes will increase or decrease the weld current in order to maintain a voltage at or close to the target voltage command, and thus changing the amount of penetration/heat input into the weld piece. By adjusting the amount of preheating current in response to changes to contact tip to work changes the penetration/heat input can be advantageously controlled. Furthermore, penetration can be changed to reflect a desired weld bead/penetration profile. For example, the preheating current may be changed into a plurality of waveforms, such as, but not limited to, a pulse type waveform to achieve the desired weld bead/penetration profile.

The preheating current could be line frequency AC delivered from a simple transformer with primary phase control. Controlling the current and voltage delivered to the preheat section may be simpler using a current-controlled control loop (also referred to as constant current, or CC), a voltage-controlled control loop (also referred to as constant voltage, or CV), constant impedance, constant enthalpy, constant penetration, or constant power depending on how the control is implemented as well as the power supply configuration to provide the power. In another aspect, the welding power source for consumable arc welding (GMAW and SAW) may include regulating a constant welding current output and adapt wire speed to maintain arc length or arc voltage set-point (e.g., CC+V process control). In yet another aspect, the welding power source may include regulating a constant welding voltage output (or arc length) and adapt wire speed to maintain arc current set-point (e.g., CV+C process control). The CC+V and CV+C process controls allow for accommodation of wire stick-out variation and preheating current/temperature variation by adapting wire feed speed (or variable deposition). In yet another aspect, the power source may include regulating a constant welding current output, the feeder maintains constant deposition, and the preheat power source adapts preheating current (or preheat power) to maintain constant arc voltage (or arc length,). A combination of wire feed speed and/or the preheating current may be changed based on the change in CTWD to maintain a constant heat input and/or penetration when using a CV+C process to control the welding-type current. For example, a change in wire feed speed may return the welding-type voltage and welding-type current to the target or average values in which case a change in preheating current does not occur. In other examples, a combination of changes in wire feed speed and preheating may be used to correct the welding-type voltage and/or the welding-type current based on the CTWD.

The change in welding arc voltage may be monitored to indicate a change in arc length while the welding current is controlled to be constant. The weld voltage would then be compared to an average voltage in the lookup table and/or the weld voltage setpoint. The preheating current would then increase or decrease to maintain the welding voltage to within a range of the lookup table value. These changes would primarily affect the weld process since the weld current and/or heat input are already held constant. It can be appreciated that the addition of preheating current/power adds a new degree of freedom to the wire welding processes (GMAW and SAW) that allows flexibility and controllability in maintaining constant weld penetration and weld width (arc current), deposition (wire speed) and process stability (arc length or voltage). These control schemes may be switched during the welding process, for example, CV+C for arc start only, and other control schemes for the main weld.

Using an advanced controlled welding waveform allows for the reduction in heat input, distortion, and improvements in bead geometry at high deposition rates. Thus, expanding the operating range of pulse welding, reducing rotational transfer at high deposition rates, and reducing spatter caused by rotational spray. By preheating the electrode wire 114, the operating range for pulse programs can be extended to higher depositions. This is possible because of the lower power that is needed to transfer the material at those deposition rates. Before, the pulse width/frequency/peak amperage were too high at higher deposition rates, that the benefits of pulsing were no longer present. By preheating the electrode wire 114, the operator is able to use similar pulse programs for higher rates (e.g., 600 inches per minute (ipm)), which was previously only available at slower rates, such as 300 ipm. Preheating the electrode wire 114 also maximizes the benefit for pulse welding with low background current. Furthermore, using a metal core with a custom pulse configuration in combination with the contact tip assembly 206 allows for heavier deposition welding at a higher quality. By preheating the electrode wire 114, it behaves similarly to a solid wire and its transfer style.

Additionally or alternatively, preheating the electrode wire 114 enables the background current of the pulse waveform to be reduced substantially, as its primary function may be changed from growing a ball to merely sustaining an arc between the electrode wire 114 and the workpiece 106. Conventionally, the background current of the pulse waveform is used to grow the droplet or ball, which is subsequently deposited to the workpiece 106. The example power supply 302a may implement the pulse waveform based on the preheating power applied to the electrode wire 114 by the preheat power supply 302b.

The welding system 100 may be configured to monitor the exit temperature of the electrode wire 114 between the preheat contact tips (e.g., the preheat temperature), as illustrated, between the first contact tip 318 and the second contact tip 308. The preheat temperature may be monitored using one or more temperature determining devices, such as a thermometer, positioned adjacent the electrode wire 114, or otherwise operably positioned, to facilitate periodic or real-time welding feedback. Example thermometers may include both contact sensors and non-contact sensors, such as non-contact infrared temperature sensors, thermistors, and/or thermocouples. An infrared thermometer determines temperature from a portion of the thermal radiation emitted by the electrode wire 114 to yield a measured preheat temperature. The temperature determining device may, in addition to or in lieu of the thermometers, comprise one or more sensors and/or algorithms that calculate the preheat temperature of the electrode wire 114. For example, the system may dynamically calculate temperature based on, for example, a current or voltage. In certain aspects, the thermometer may measure the temperature of the dielectric guide or first contact tip to infer the wire temperature.

In operation, the operator may set a target predetermined preheat temperature whereby the welding system 100 dynamically monitors the preheat temperature of the electrode wire 114 and adjusts the preheating current via the second power supply 302b to compensate for any deviation (or other difference) of the measured preheat temperature from the target predetermined preheat temperature. Similarly, controls may be set such that a welding operation cannot be performed until the electrode wire 114 has been preheated to the predetermined preheat temperature.

Figure 4C:
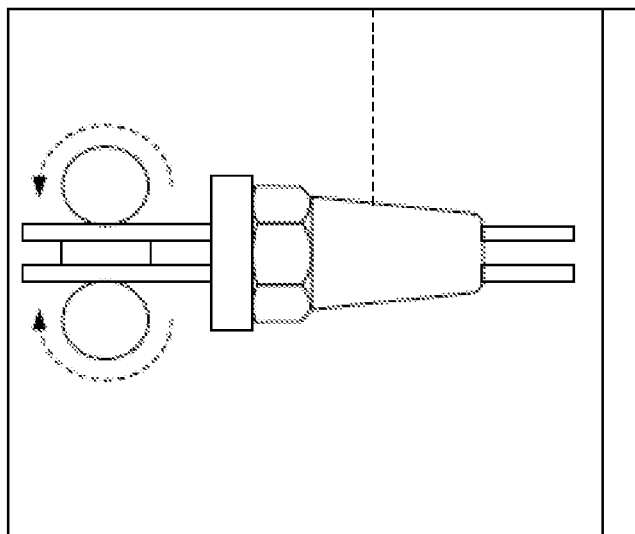
FIGS. 4a, 4b, and 4c illustrate example preheat torch wire configurations.
Figure 4B:
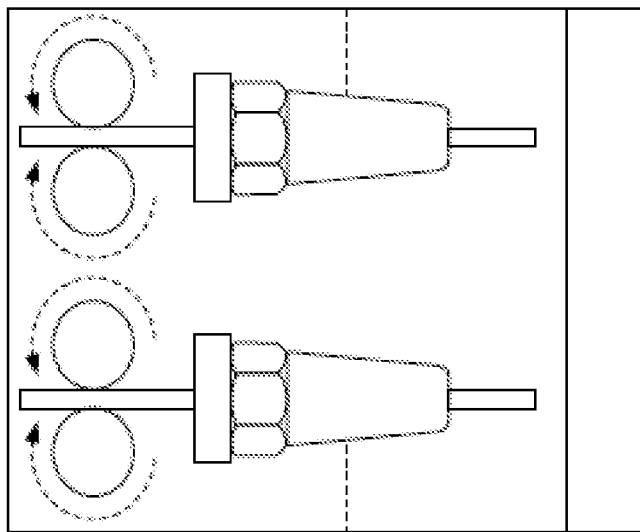
Figure 4A:
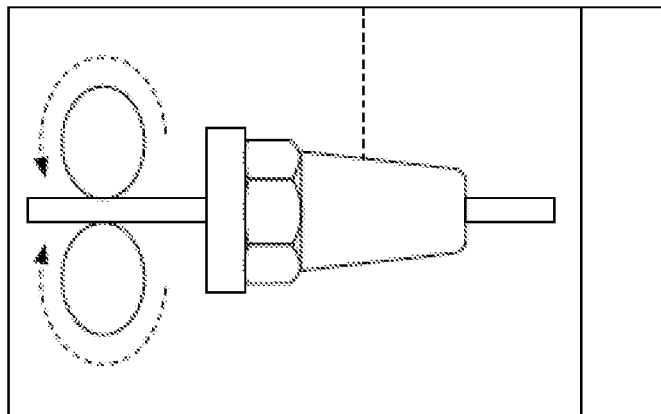

As illustrated in FIGS. 4a through 4c, the preheat torch can be used in combination with a submerged arc power supply in a single preheated wire, a tandem preheated wire (two power sources), and/or a twin preheated wire configuration (one power source). For example, FIG. 4a illustrates a submerged arc (SAW) power supply in a single preheated wire configuration. The wire may be preheated with CV AC, CV EP, CV EN, CV+C AC, CV+C EP, CV+C EN, CC AC, CC EP, CC EN, CC+V AC, CC+V EP, and/or CC+V EN. FIG. 4b illustrates a submerged arc power supply in a tandem preheated wire configuration. Wire could be used in a standard SAW configuration or any variation of the previously mentioned. The wire may be preheated with CV AC, CV EP, CV EN, CV+C AC, CV+C EP, CV+C EN, CC AC, CC EP, CC EN, CC+V AC, CC+V EP, and/or CC+V EN. In certain aspects, one wire may be preheated and one normal (Front-Back wires). Moreover, different polarity combinations may be employed for each wire (EP, EN, AC, CV+C, CC+V). One example tandem SAW configuration in FIG. 4b for certain applications is that the lead arc is DCEP on unheated solid wire for penetration, and the trail arc is DCEN on resistively preheated metal core wire for deposition. Finally, FIG. 4c illustrates a submerged arc power supply in a single preheated wire configuration. The wire may be preheated with CV AC, CV EP, CV EN, CV+C AC, CV+C EP, CV+C EN, CC AC, CC EP, CC EN, CC+V AC, CC+V EP, and/or CC+V EN.

Figure 5:
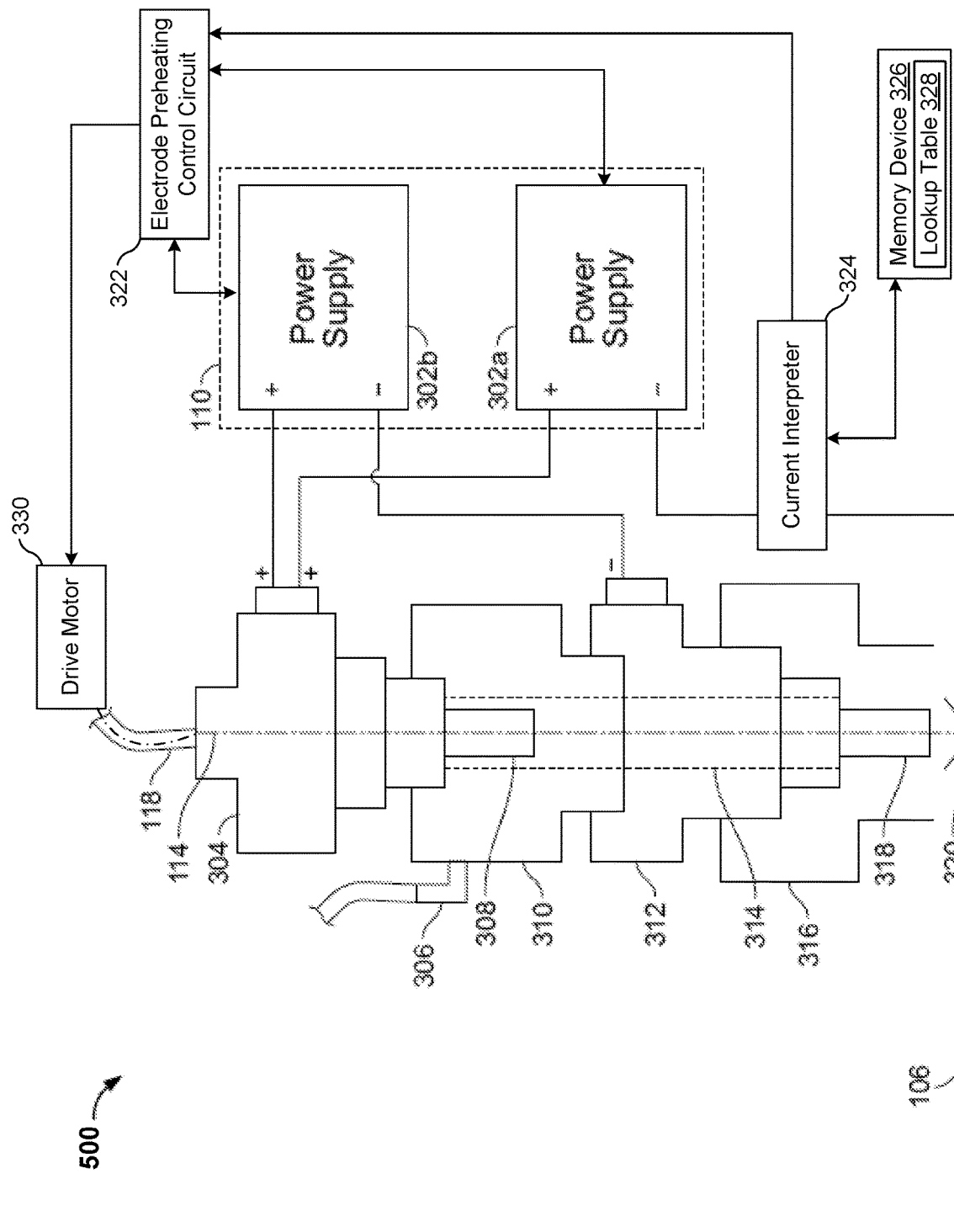
FIG. 5 illustrates a functional diagram of another example contact tip assembly in which the power supply provides the welding power to the electrode wire.

FIG. 5 illustrates a functional diagram of another example contact tip assembly 500. The contact tip assembly 500 is similar to the assembly 206 illustrated in FIG. 3. The assembly 500 includes the power supply 302a to provide the welding power to the electrode wire 114 (e.g., for generating the welding arc 320 or other welding power transfer). The assembly 500 also includes the power supply 302b to generate a preheating current to heat the electrode wire 114. The assembly includes the first contact tip 318 and the second contact tip 308. The preheating power supply 302b has the same electrical connections to the second contact tip 308 and the first contact tip 318 as described above with reference to FIG. 3. Instead of the welding power supply 302a being electrically connected to the first contact tip 318 (e.g., via the positive polarity connection) and the workpiece 106 (e.g., via the negative polarity connection) illustrated in FIG. 3 above, the welding power supply 302a is electrically connected to the second contact tip 308 via the positive polarity connection and to the workpiece 106 via the negative polarity connection.

In the example assembly of FIG. 5, the preheat power supply 302b provides preheating current to the portion of the electrode wire 114 between the contact tips 308 and 318, which may occur before welding and/or during welding. In operation, the welding power supply 302a provides the welding current to support the arc 320. In the configuration of FIG. 5, the energy provided by the welding power supply 302a also preheats the electrode wire 114 between the second contact tip 308 and the arc 320. In some examples, the preheat power supply 302b provides power to preheat the electrode wire 114 in conjunction with the energy provided by the welding power supply 302a, thereby reducing the power to be delivered by the welding power supply 302a.

Figure 6:
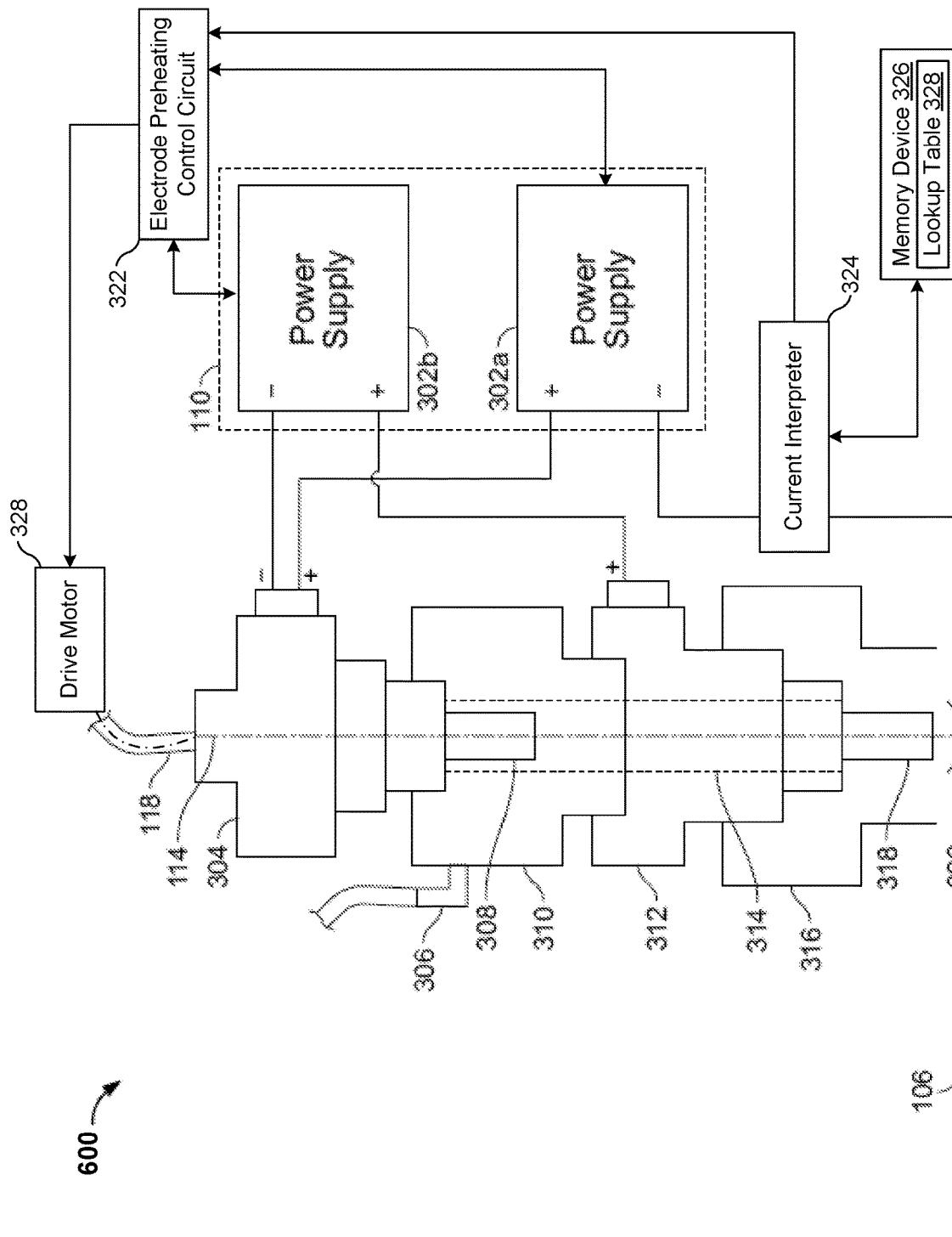
FIG. 6 illustrates a functional diagram of another example contact tip assembly in which the electrical connections between preheat power supply and the contact tips are reversed relative to the connections in FIG. 5.

FIG. 6 illustrates a functional diagram of another example contact tip assembly 600. The assembly 600 is similar to the assembly 500 of FIG. 5. However, the electrical connections between preheat power supply 302b and the contact tips 308 and 318 are reversed relative to the connections in FIG. 5. In other words, the preheating power supply 302b is electrically connected to the second contact tip 308 via the negative polarity connection and is electrically connected to the first contact tip 318 via the positive polarity connection.

In the example assembly 600, the power supply 302b may provide preheating power to the portion of the wire between the contact tips 308 and 318 while the welding power supply 302a is not providing power (e.g., while not welding). When the welding power supply 302a provides the welding power to the assembly 600, the preheat power supply 302b is switched off and/or used to reduce a portion of the welding power provided by the welding power supply 302a to control preheating of the electrode wire 114 by the welding power supply 302a.

Figure 7:
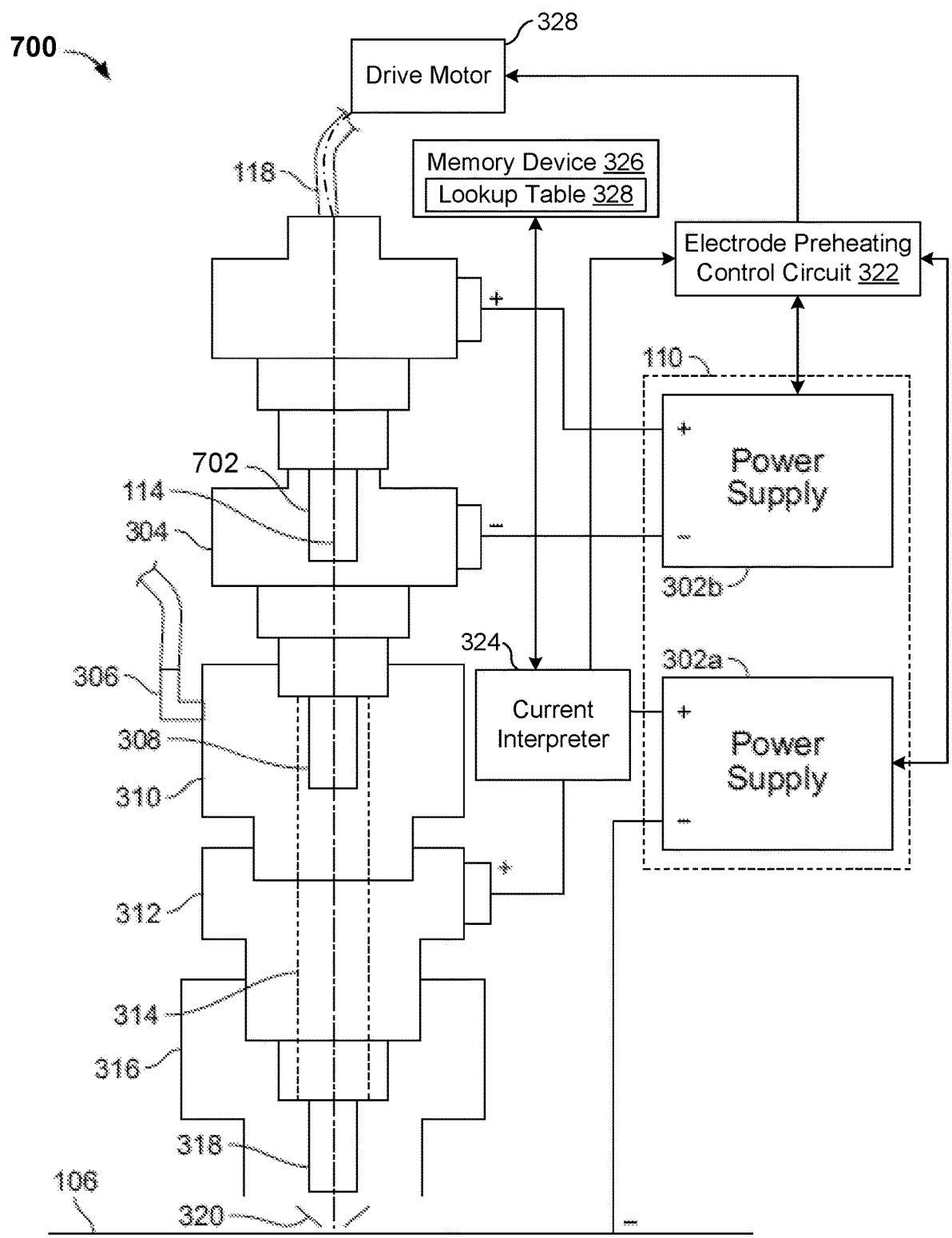
FIG. 7 illustrates a functional diagram of another example contact tip assembly in which the power supply provides the welding power to the electrode wire.

FIG. 7 illustrates a functional diagram of another example contact tip assembly 700. The assembly 700 includes the power supply 302a to provide the welding power to the electrode wire 114 (e.g., for generating the welding arc 320 or other welding power transfer). The assembly 700 also includes the power supply 302b to generate a preheating current to heat the electrode wire 114. The welding power supply 302a is electrically connected to the first contact tip 318 (e.g., via the positive polarity connection) and the workpiece 106 (e.g., via the negative polarity connection).

In the assembly 700 of FIG. 7, the preheating power supply 302b is electrically connected to the electrode wire 114 such that the welding current provided by the power supply 302a is not superimposed on the wire with the preheating current provided by the preheat power supply 302b. To this end, the example assembly 700 includes a third contact tip 702, to which the preheat power supply 302b is electrically connected. While FIG. 7 illustrates an example in which the preheating power supply 302b is electrically connected to the third contact tip 702 via the positive polarity connection and is electrically connected to the second contact tip 308 via the negative polarity connection, in other examples the polarities of the connections are reversed.

Figure 8:
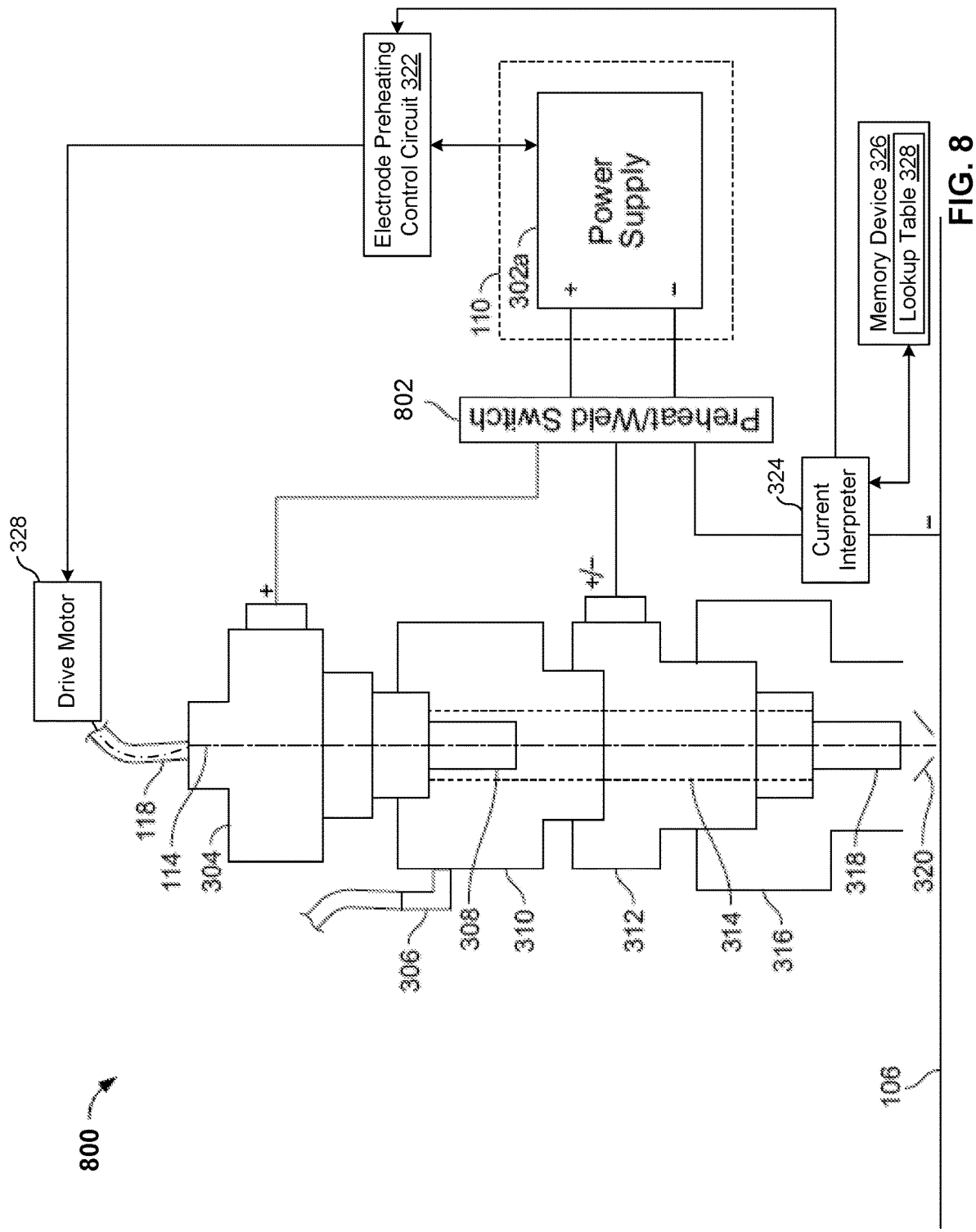
FIG. 8 illustrates a functional diagram of another example contact tip assembly in which a single power supply that provides both preheating power and welding power to the electrode via the first contact tip and/or the second contact tip.

FIG. 8 illustrates a functional diagram of another example contact tip assembly 800. The assembly 800 includes a single power supply that provides both preheating power and welding power to the electrode wire 114 via the first contact tip 318 and/or the second contact tip 308. To control the direction of preheating and/or welding power to the contact tips 308 and 318, the assembly 800 includes a preheat/weld switch 802. The preheat/weld switch 802 switches the electrical connections between the welding power supply 302a and the first contact tip 318, the second contact tip 308, and/or the workpiece 106.

The welding power supply 302a provides preheating to the electrode wire 114 by, for example, controlling the preheat/weld switch 802 to connect the positive polarity terminal of the welding power supply 302a to one of the contact tips 308 and 318 and to connect the negative polarity terminal of the welding power supply 302a to the other of the contact tips 308 and 318. The welding power supply 302a provides welding to the electrode wire 114 by, for example, controlling the preheat/weld switch 802 to connect the positive polarity terminal of the welding power supply 302a to one of the workpiece 106 or one of the contact tips 308 and 318 and to connect the negative polarity terminal of the welding power supply 302a to the other of the workpiece 106 or one of the contact tips 308 and 318 (e.g., based on whether DCEN or DCEP is being used).

If the preheat/weld switch 802 connects one of the terminals of the welding power supply 302a to the second contact tip 308 and connects the other of the terminals of the welding power supply 302a to the workpiece 106, the welding current supplied by the welding power supply 302a also provides preheating to the electrode wire 114. In some examples, the preheat/weld switch 802 alternates between connecting the welding power supply 302a to a first set of electrical connections for preheating the electrode wire 114 (e.g., connecting to the contact tips 308 and 318), to a second set of electrical connections for welding (e.g., connecting to the workpiece 106 and the first contact tip 318), and/or to a third set of electrical connections for simultaneously preheating the electrode wire 114 and welding (e.g., connecting to the workpiece 106 and the second contact tip 308).

Some example welding systems 100 use radiated heating to heat the electrode wire 114 via a wire liner. An example includes constructing the coiled wire liner using a nichrome alloy, platinum, and/or another suitable material, to simultaneously physically support and/or guide the electrode wire 114 from the wire supply to the welding gun and to heat the electrode wire 114 at the same time. The wire liner is heated by the example preheat power supply 302b. A shorter portion of the wire liner may be heated using higher heating current, and/or a longer portion of the wire liner (e.g., most of the wire liner extending from the wire feeder to the welding torch) may be heated using a reduced heating current. The electrode wire 114 is gradually heated by the wire liner using radiated heating so that the electrode wire 114 has an elevated temperature by the time the electrode wire 114 reaches the welding torch and/or the first contact tip 318.

Disclosed examples may be used to perform cladding operations with reduced dilution of the base material. In such examples, the preheat power supply 302b provides high preheat power to preheat wire to near melting. The welding power supply 302a then provides a relatively low arc current (e.g., 15-20 A) to bring the wire tip to the actual melting point. However, because the relatively low current (e.g., 15-20 A) may not be enough to cause pinching off of the melted wire to transfer the liquid metal across the arc, some such examples use a rapid-response motor to oscillate the wire. Oscillation of the wire jolts or shakes the liquid metal off of the wire tip. An example of such an oscillation technique is described by Y. Wu and R. Kovacevic, "Mechanically assisted droplet transfer process in gas metal arc welding," *Proceedings of the Institution of Mechanical Engineers Vol* 216 *Part B: J Engineering Manufacture*, p. 555, 2002, which is incorporated by reference herein in its entirety. By using low arc current, the example cladding method reduces base metal dilution and/or reduces costs of methods such as laser cladding.

In some examples, welding-type equipment may be used to perform metal additive manufacturing and/or additive metal coating. For example, a coating system or additive manufacturing system uses the wire preheating and a voltage clamp as described above, but omits the laser. In some other examples, the cladding system uses the wire preheating and omits both the clamp and the laser. In either case, the metal may not necessarily bond to the workpiece, but may form a coating and/or be laid on a base from which the metal can later be removed.

In some examples, a cladding system uses the resistive preheating to preheat the wire. The preheated wire is melted using a TIG welding arc.

Some example cladding systems use the preheating system to perform both pilot preheating (e.g., prior to the wire making contact to the workpiece where the two tips in the torch do the preheating) and a transferred preheating (e.g., open up the tip nearer the workpiece once current starts flowing in the work lead). The cladding system switches the preheating system between the pilot preheating mode and the transferred preheating mode.

In some cases, preheating the electrode with an extended stick out length can suffer from instability, which is caused by the short circuit control response in submerged arc welding and/or in GMAW methods. A conventional short circuit control response is to increase current to clear a detected short circuit. However, the current increase overheats the extended stick out to very high temperatures, causing the wire to lose rigidity and/or mechanical stability. As a result, the superheated wire section melts off at a higher rate than normal and may introduce arc length hunting or oscillation while the welding system 100 attempts to obtain a stable arc length or contact tip to work distance. Some examples address this instability by controlling the welding power supply 302a using a current-controlled (e.g., constant current) mode during a prolonged short circuit event (e.g., a short circuit lasting more than 5 ms). The current-controlled mode does not include a shark fin response or high artificial inductance typical of short circuit clearing methods. For example, the current-controlled mode may use a same average current as used in the spray mode for that wire feed rate (e.g., a high current) or a fixed low current (e.g., 50 A or lower). The welding system 100 also initiates wire retraction to clear the short circuit. After the short is cleared, the welding system 100 reverts the mode to voltage-controlled (e.g., constant voltage) spray and/or pulse spray mode. In such examples, the wire drive motor is highly responsive (e.g., similar to motors used in controlled short circuit (CSC) modes), but at reduced duty cycles relative to duty cycles used in CSC modes. In such examples, the motor is not used to clear shorts as quickly as in CSC modes.

Some examples increase the deposition rate of welding while reducing heat input to the workpiece using a spray mode. The welding system 100 switches between spray mode at low wire speed mode and cold wire feed at high wire speed mode. In this context, cold wire refers to non-melted wire, whether preheated or not preheated. In some such examples, the welding system 100 preheats the electrode wire 114 and performs welding in a spray mode (e.g., voltage-controlled and/or pulse), and then reduces the current to a lower current level (e.g., 50 A or less). After a period of operating in spray mode, the welding system and accelerates the wire feed rate (e.g., to the maximum motor feed rate) to input cold (e.g., non-melted) electrode wire 114 to the weld puddle. The input of the cold wire both adds filler metal and cools the weld puddle. Using preheated wire increases deposition of wire into the weld puddle before the weld puddle cools too much to further melt the wire, but preheating of the wire may be omitted. The welding system 100 then retracts the wire while maintaining the lower welding current to restart the weld arc. When the arc is restarted, the welding system 100 returns to the spray mode at the higher current and feeds the electrode wire 114 at the lower wire feed rate. In some examples, the welding system 100 maintains a higher current when feeding the cold wire into the weld puddle to increase deposition, but reduces the current (e.g., to 50 A or less) prior to retracting the wire, to reduce spatter during the arc restart. In such examples, the wire drive motor is highly responsive (e.g., similar to motors used in controlled short circuit (CSC) modes), but at reduced duty cycles relative to duty cycles used in CSC modes. In such examples, the motor is not used to clear shorts as quickly as in CSC modes.

Poor physical contact between the electrode wire 114 and the contact tip 318 can, in some cases, result in arcing between the electrode wire 114 and the contact tip 318, which can damage the contact tip 318. Disclosed examples include a clamping diode (e.g., a Zener diode) between to clamp an output voltage of the preheat power supply 302b to clamp the output voltage to less than a threshold (e.g., less than 14V). Using the clamping diode reduces or eliminates the likelihood of initiating an arc between the contact tips 308 and 318 and the electrode wire 114. Additionally, the clamping diode reduces the likelihood of arcing in the first contact tip 318 for the main welding current. When the physical contact is poor between the electrode wire 114 and the first contact tip 318, the arc current flow may conduct or be redirected through the clamping circuit and the second contact tip 308 to the electrode wire 114 to prevent tip burn back and extend the life of first contact tip 318. The clamping diode is selected to have a current capacity to conduct both preheating current and welding current (e.g., with few hundred nanosecond turn-on). In some examples, the clamping diode is a silicon carbide rectifier diode.

In some examples, the second contact tip 308 is used as a sensor for detecting conditions for arcing at the first contact tip 318 (e.g., without preheating the electrode wire 114). When such conditions for arcing at the first contact tip 318 are detected, the welding system 100 clamps the tip-to-wire contact voltage as described above.

While examples disclosed above include contact tips 308 and 318 that are coaxially aligned, in other examples the axes of the contact tips 308 and 318 are offset (e.g., parallel but not aligned) and/or tilted (e.g., not parallel). In some other examples, a curved or bent wire support (e.g., ceramic) is provided between the two contact tips 308 and 318 to improve contact at the first contact tip 318. In some other examples, the first contact tip 318 is provided with a spring-loaded contact to contact the electrode wire 114, thereby ensuring contact between the first contact tip 318 and the electrode wire 114.

In some examples, the welding system 100 reacts to wire short circuiting events. The example welding system 100 uses feedback to shut down preheat power immediately to prevent soft, preheated wire from being compressed and causing a jam between the first contact tip 318 and the second contact tip 308. The welding system 100 uses feedback such as from a wire feed motor (e.g., motor current, motor torque, etc.) and/or another wire feed force sensor between the two tips motor current or other feeding force sensor to provide rapid detection. Additionally or alternatively, the welding system 100 uses feedback such as a duration of the short circuit measurement (e.g., arc voltage) to detect a wire stubbing event (e.g., extinguishing of the arc by contacting the electrode wire 114 to the workpiece 106). In response to detecting the event, the welding system 100 shuts down or disables the preheat power supply, and/or reduces the preheating power to the preheat power supply to prevent wire noodling between the contact tips.

In some examples, the welding system 100 includes a welding-type power source to provide welding-type power to a welding-type circuit, where the welding-type circuit includes a welding-type electrode and a first contact tip of a welding torch as discussed herein. The example welding system 100 also includes one of the example preheating circuits disclosed herein, which provides preheating power through a first portion of the welding-type electrode via a second contact tip of the welding torch. Disclosed examples further include the electrode preheat control circuit 322 that is configured to control the preheating power based on a user input specifying the preheating power.

Figure 9:
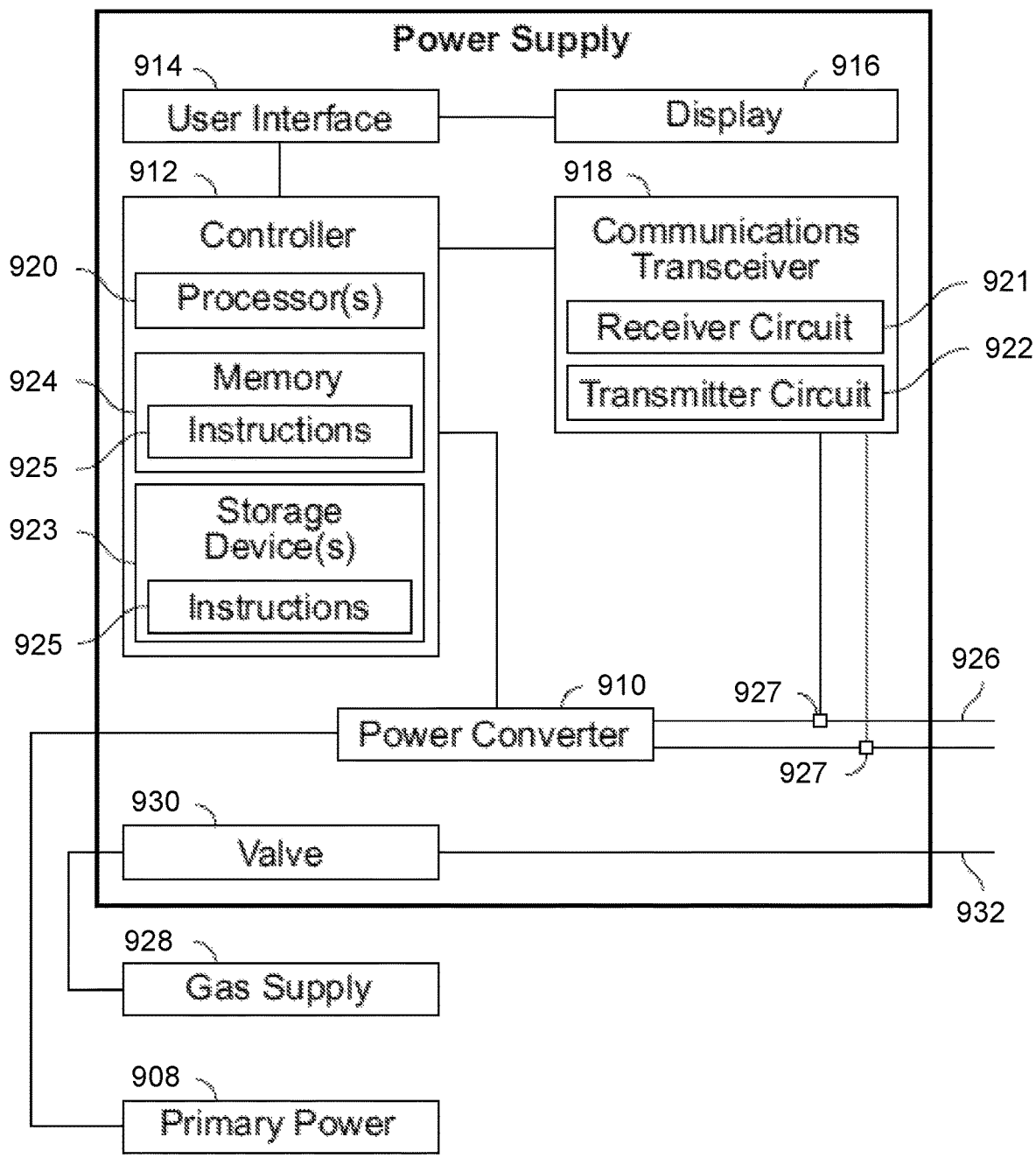
FIG. 9 is a block diagram of an example implementation of the power supplies of FIGS. 3, 5, 6, 7, and/or 8.

FIG. 9 is a block diagram of an example implementation of the power supplies 302a, 302b of FIGS. 3, 5, 6, 7, and/or 8. The example power supply 302a, 302b powers, controls, and supplies consumables to a welding application. In some examples, the power supply 302a, 302b directly supplies input power to the welding torch 108. In the illustrated example, the welding power supply 302a, 302b is configured to supply power to welding operations and/or preheating operations. The example welding power supply 302a, 302b also provides power to a wire feeder to supply the electrode wire 94 to the welding torch 108 for various welding applications (e.g., GMAW welding, flux core arc welding (FCAW)).

The power supply 302a, 302b receives primary power 908 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 908 may be supplied from an offsite location (e.g., the primary power may originate from the power grid). The welding power supply 302a, 302b includes a power converter 910, which may include transformers, rectifiers, switches, and so forth, capable of converting the AC input power to AC and/or DC output power as dictated by the demands of the system (e.g., particular welding processes and regimes). The power converter 910 converts input power (e.g., the primary power 908) to welding-type power based on a weld voltage setpoint and outputs the welding-type power via a weld circuit.

In some examples, the power converter 910 is configured to convert the primary power 908 to both welding-type power and auxiliary power outputs. However, in other examples, the power converter 910 is adapted to convert primary power only to a weld power output, and a separate auxiliary converter is provided to convert primary power to auxiliary power. In some other examples, the power supply 302a, 302b receives a converted auxiliary power output directly from a wall outlet. Any suitable power conversion system or mechanism may be employed by the power supply 302a, 302b to generate and supply both weld and auxiliary power.

The power supply 302a, 302b includes a controller 912 to control the operation of the power supply 302a, 302b. The welding power supply 302a, 302b also includes a user interface 914. The controller 912 receives input from the user interface 914, through which a user may choose a process and/or input desired parameters (e.g., voltages, currents, particular pulsed or non-pulsed welding regimes, and so forth). The user interface 914 may receive inputs using any input device, such as via a keypad, keyboard, buttons, touch screen, voice activation system, wireless device, etc. Furthermore, the controller 912 controls operating parameters based on input by the user as well as based on other current operating parameters. Specifically, the user interface 914 may include a display 916 for presenting, showing, or indicating, information to an operator. The controller 912 may also include interface circuitry for communicating data to other devices in the system, such as the wire feeder. For example, in some situations, the power supply 302a, 302b wirelessly communicates with other welding devices within the welding system. Further, in some situations, the power supply 302a, 302b communicates with other welding devices using a wired connection, such as by using a network interface controller (NIC) to communicate data via a network (e.g., ETHERNET, 10 BASE2, 10 BASE-T, 100 BASE-TX, etc.). In the example of FIG. 1, the controller 912 communicates with the wire feeder via the weld circuit via a communications transceiver 918.

The controller 912 includes at least one controller or processor 920 that controls the operations of the welding power supply 902. The controller 912 receives and processes multiple inputs associated with the performance and demands of the system. The processor 920 may include one or more microprocessors, such as one or more "general-purpose" microprocessors, one or more special-purpose microprocessors and/or ASICS, and/or any other type of processing device. For example, the processor 920 may include one or more digital signal processors (DSPs).

The example controller 912 includes one or more storage device(s) 923 and one or more memory device(s) 924. The storage device(s) 923 (e.g., nonvolatile storage) may include ROM, flash memory, a hard drive, and/or any other suitable optical, magnetic, and/or solid-state storage medium, and/or a combination thereof. The storage device 923 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 924 may include a volatile memory, such as random access memory (RAM), and/or a nonvolatile memory, such as read-only memory (ROM). The memory device 924 and/or the storage device(s) 923 may store a variety of information and may be used for various purposes. For example, the memory device 924 and/or the storage device(s) 923 may store processor executable instructions 925 (e.g., firmware or software) for the processor 920 to execute. In addition, one or more control regimes for various welding processes, along with associated settings and parameters, may be stored in the storage device 923 and/or memory device 924, along with code configured to provide a specific output (e.g., initiate wire feed, enable gas flow, capture welding data, detect short circuit parameters, determine amount of spatter) during operation.

In some examples, the welding power flows from the power converter 910 through a weld cable 926. The example weld cable 926 is attachable and detachable from weld studs at each of the welding power supply 302a, 302b (e.g., to enable ease of replacement of the weld cable 926 in case of wear or damage). Furthermore, in some examples, welding data is provided with the weld cable 926 such that welding power and weld data are provided and transmitted together over the weld cable 926. The communications transceiver 918 is communicatively coupled to the weld cable 926 to communicate (e.g., send/receive) data over the weld cable 926. The communications transceiver 918 may be implemented based on various types of power line communications methods and techniques. For example, the communications transceiver 918 may utilize IEEE standard P1901.2 to provide data communications over the weld cable 926. In this manner, the weld cable 926 may be utilized to provide welding power from the welding power supply 302a, 302b to the wire feeder and the welding torch 108. Additionally or alternatively, the weld cable 926 may be used to transmit and/or receive data communications to/from the wire feeder and the welding torch 108. The communications transceiver 918 is communicatively coupled to the weld cable 926, for example, via cable data couplers 927, to characterize the weld cable 926, as described in more detail below. The cable data coupler 927 may be, for example, a voltage or current sensor.

In some examples, the power supply 302a, 302b includes or is implemented in a wire feeder.

The example communications transceiver 918 includes a receiver circuit 921 and a transmitter circuit 922. Generally, the receiver circuit 921 receives data transmitted by the wire feeder via the weld cable 926 and the transmitter circuit 922 transmits data to the wire feeder via the weld cable 926. As described in more detail below, the communications transceiver 918 enables remote configuration of the power supply 302a, 302b from the location of the wire feeder and/or compensation of weld voltages by the power supply 302a, 302b using weld voltage feedback information transmitted by the wire feeder 104. In some examples, the receiver circuit 921 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 302a, 302b (e.g., the wire feeder) while the weld current is flowing through the weld circuit.

Example implementations of the communications transceiver 918 are described in U.S. Pat. No. 9,012,807. The entirety of U.S. Pat. No. 9,012,807 is incorporated herein by reference. However, other implementations of the communications transceiver 918 may be used.

The example wire feeder 104 also includes a communications transceiver 919, which may be similar or identical in construction and/or function as the communications transceiver 918.

In some examples, a gas supply 928 provides shielding gases, such as argon, helium, carbon dioxide, and so forth, depending upon the welding application. The shielding gas flows to a valve 930, which controls the flow of gas, and if desired, may be selected to allow for modulating or regulating the amount of gas supplied to a welding application. The valve 930 may be opened, closed, or otherwise operated by the controller 912 to enable, inhibit, or control gas flow (e.g., shielding gas) through the valve 930. Shielding gas exits the valve 930 and flows through a cable 932 (which in some implementations may be packaged with the welding power output) to the wire feeder which provides the shielding gas to the welding application. In some examples, the power supply 302*a*, 302*b* does not include the gas supply 928, the valve 930, and/or the cable 932.

While disclosed examples describe the electrode preheat control circuit 322, the current interpreter 324, and/or the memory device 326 as external to the power supplies 302*a*, 302*b*, in other examples the power supplies 302*a*, 302*b* implement the electrode preheat control circuit 322, the current interpreter 324, and/or the memory device 326, and/or portions thereof.

Figure 10:
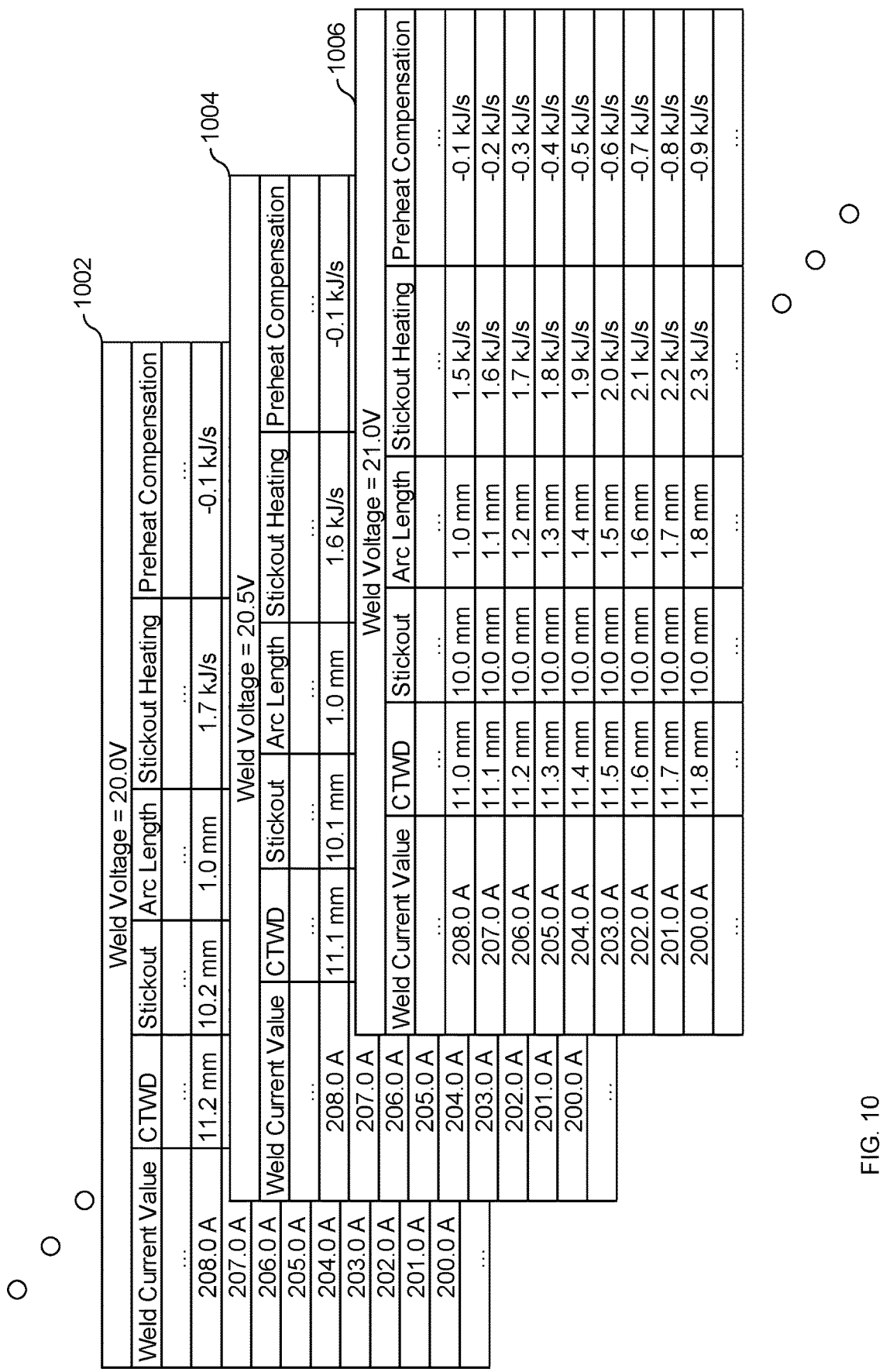
FIG. 10 illustrates example lookup tables that associate welding-type current values with contact-tip-to-work-distance values, stickout lengths, arc lengths, stickout heating changes, and/or preheat compensation adjustments.

FIG. 10 illustrates example lookup tables 1002, 1004, 1006 that associate welding-type current values with CTWD values, stickout lengths, arc lengths, stickout heating changes, and/or preheat compensation adjustments. The example lookup tables 1002, 1004, 1006 include example data that may be used to implement the lookup table(s) 328 stored in the memory device 326.

The tables 1002, 1004, 1006 are pre-populated with the relationships between weld current values and CTWD values, stickout lengths, arc lengths, stickout heating changes, and/or preheat compensation adjustments. Upon receiving a welding-type current sample, the current interpreter 324 may look up the welding-type current sample and/or the average welding-type current in one of the tables 1002, 1004, 1006 based on the welding setpoint voltage.

While an example organization of the tables 1002, 1004, 1006 is shown in FIG. 10, the tables 1002, 1004, 1006 may be organized in other ways.

In addition or as an alternative to the examples above involving controlling welding currents and/or preheating currents based on changes in CTWD, the contact tip assembly 206 of FIG. 3 may be used to control the CTWD of a robot manipulating the contact tip assembly 206 based on detecting welding-type current, welding-type voltage, preheating current, and/or preheating voltage. For example, a robot positioning controller may adjust a CTWD by the robot (e.g., within a specified envelope to reduce the probability of a collision) to cause the welding control loop and the preheating control loop to self-adjust to desired voltages and/or currents. A lookup table similar to the lookup table(s) 328 may be referenced by the robot controller and/or may be referenced to identify a command for the robot controller.

Figure 11:
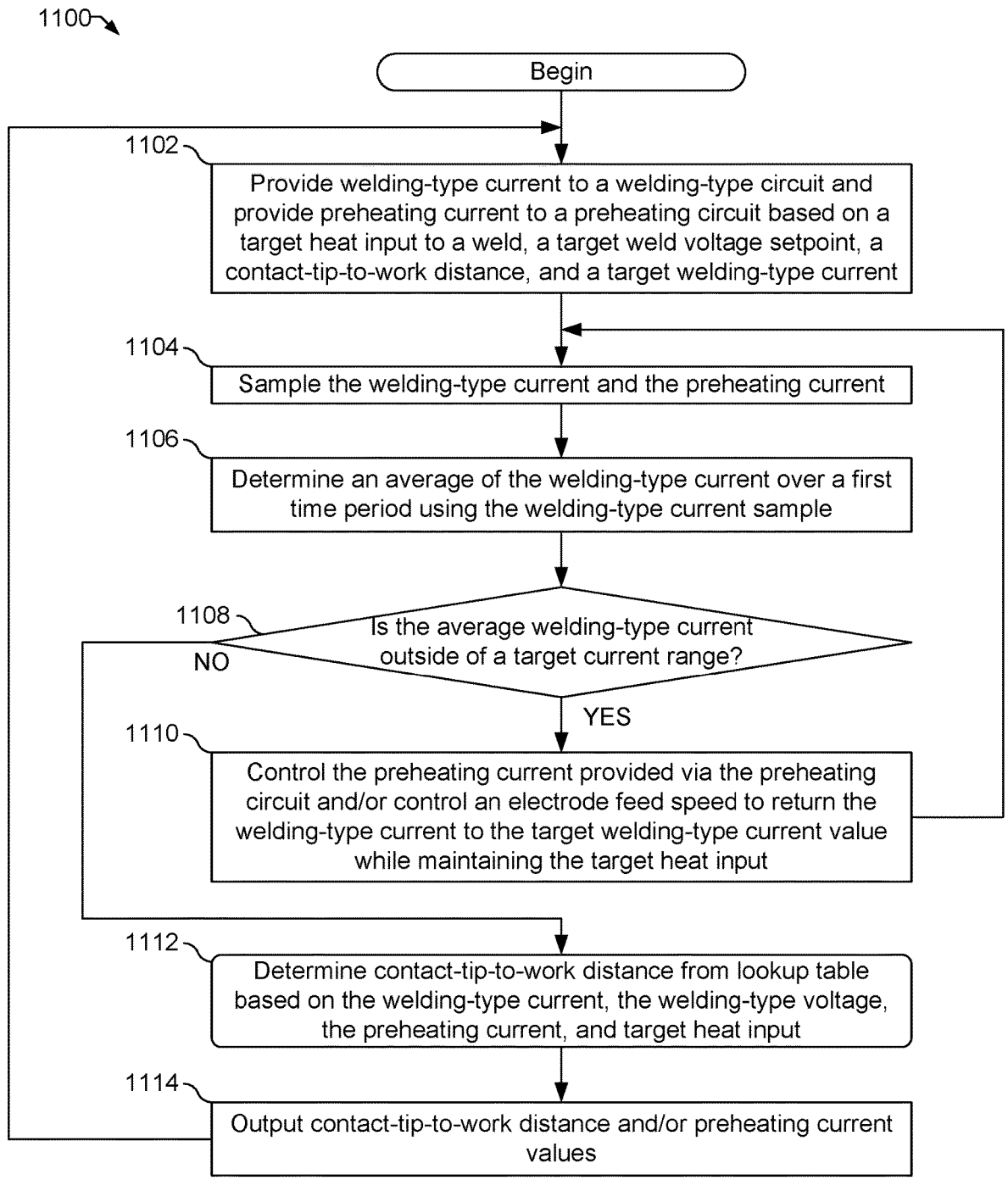
FIG. 11 is a flowchart representative of example machine readable instructions which may be executed by an electrode preheat control circuit to control preheating of an electrode wire.

FIG. 11 is a flowchart representative of example machine readable instructions 1100 which may be executed by the electrode preheat control circuit 322 of FIGS. 3, 5, 6, 7, and/or 8 to control preheating of the electrode wire 114. The example instructions 1100 are described below with reference to FIG. 3, but may be implemented using any of the example systems disclosed herein.

At block 1102, the example power supply 302*a* provides welding-type current to a welding-type circuit and the example power supply 302*b* provides preheating current to a preheating circuit based on a target heat input to a weld, a target weld voltage setpoint, a CTWD, and a target welding-type current. In the example of FIG. 3, the power supply 302*a* may implement a voltage-controlled control loop to provide the welding-type current via the contact tip 318, and the electrode preheat control circuit 322 controls the power supply 302*b* to provide the preheating current via the contact tips 308 and 318. However, other arrangements to deliver the welding-type current and/or the preheating current may be used as shown above with reference to FIGS. 5, 6, 7, and/or 8.

At block 1104, the current interpreter 324 samples the welding-type current and the preheating current. For example, current sensors coupled to the positive and/or the negative terminals of the power supply 302*a* may sample the welding-type current output by the power supply 302*a*, and current sensors coupled to the positive and/or negative terminals of the power supply 302*b* may sample the preheating current output by the power supply 302*b*.

At block 1106, the current interpreter 324 determines an average of the welding-type current over a first time period using the welding-type current sample. For example, the current interpreter 324 may determine a running average of the welding-type current for the most recent X samples, where X may be selected in conjunction with the sampling rate of the current and/or based on the desired responsiveness of the preheating current to changes in the welding-type current.

At block 1108, the current interpreter 324 determines whether the average welding-type current is outside of a target current range. The target current range may be selected based on the target welding-type current value. If the average welding-type current is outside of the target current range (block 1108), at block 1110 the electrode preheat control circuit 322 controls the preheating current provided via the preheating circuit to return the welding-type current to the target welding-type current value, while maintaining the target heat input. For example, as discussed above, a decrease in the CTWD that causes an increase in the welding-type current above the target current range would result in the electrode preheat control circuit 322 increasing the preheating current to reduce the welding-type current back to the target current range. After controlling the preheating current (block 1110), control returns to block 1104 to sample the welding-type current and the preheating current (e.g., to determine when the welding-type current has returned to the target current range).

When the average welding-type current is within the target current range (block 1108), at block 1112 the current interpreter 324 determines the CTWD (and/or stickout and/or arc length) from the lookup table(s) 328 based on the welding-type current, the welding-type voltage, the preheating current, and the target heat input. For example, the current interpreter 324 may determine the CTWD by referencing the example tables 1002, 1004, 1006 using the welding-type current, the welding-type voltage, the preheating current, and the target heat input, and/or by interpolating the CTWD from multiple CTWDs. An example implementation of block 1112 is described below with reference to FIG. 12.

At block 1114, the current interpreter 324 outputs the CTWD (and/or stickout and/or arc length) and/or preheating current values. For example, the current interpreter 324 may display the CTWD and/or the preheating current values, and/or corresponding information such as weld penetration, via the user interface 914 of FIG. 9.

At block 1110, the electrode preheat control circuit 322 controls the preheating current provided via the preheating circuit and/or controls an electrode feed speed to maintain the target heat input to the weld, based on a change in the heat input caused by the change in the CTWD, the stickout length, and/or the arc length. For example, the electrode preheat control circuit 322 may respond to detecting reduced stickout heating of the electrode 114 by increasing the preheating current provided by the preheating power supply 302b and/or be reducing an electrode feed speed to increase the preheating by the preheating circuit and/or to increase the stickout preheating. Conversely, the electrode preheat control circuit 322 may respond to detecting increased stickout heating of the electrode 114 by reducing the preheating current provided by the preheating power supply 302b and/or be increasing an electrode feed speed to reduce the preheating by the preheating circuit and/or to reduce the stickout preheating.

After controlling to the preheating current (e.g., applying commands to the preheating current), control returns to block 1102 to continue controlling the preheating of the electrode wire 114.

Figure 12:
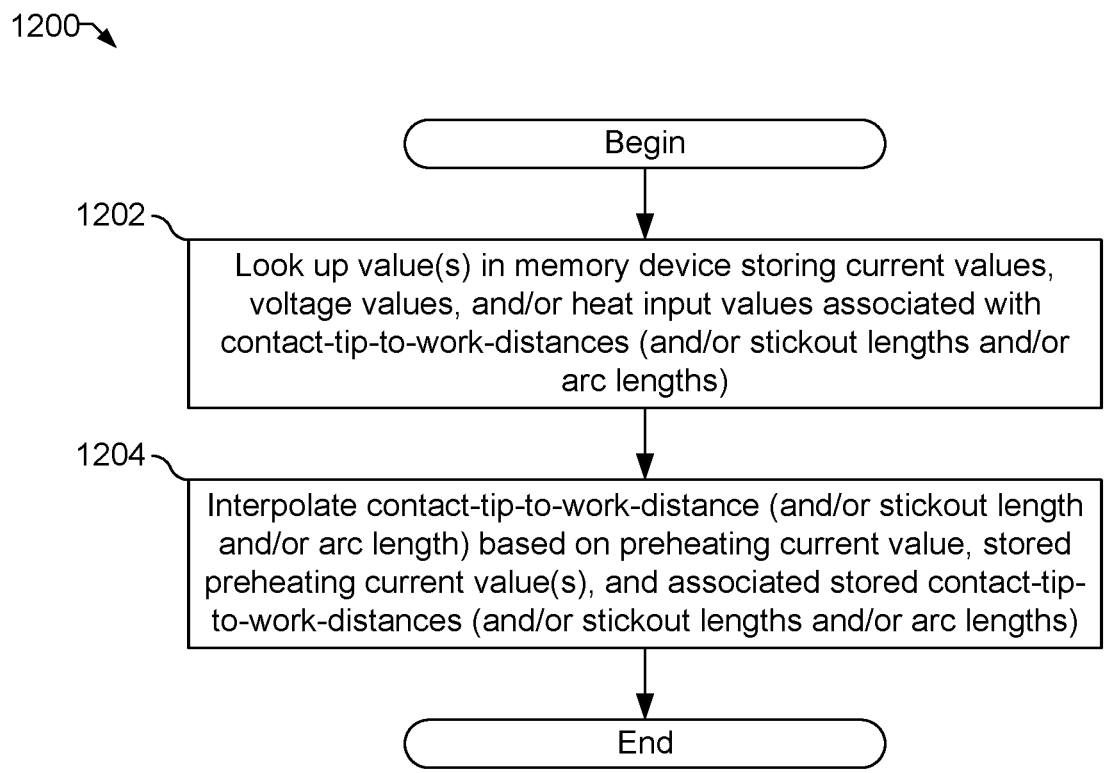
FIG. 12 is another flowchart representative of example machine readable instructions which may be executed by an electrode preheat control circuit to determine a contact-tip-to-work-distance, a stickout length, or an arc length based on a measured welding-type current.

FIG. 12 is another flowchart representative of example machine readable instructions 1100 which may be executed by the electrode preheat control circuit 322 of FIGS. 3, 5, 6, 7, and/or 8 to determine a contact-tip-to-work-distance, a stickout length, or an arc length based on a at least one of a measured welding-type current sample, preheating current, preheating impedance, preheating power, preheating enthalpy, or electrode preheating temperature. The example instructions 1200 are described below with reference to FIG. 3, but may be implemented using any of the example systems disclosed herein.

At block 1202, the electrode preheat control circuit 322 looks up value(s) in a memory device (e.g., the memory device 326) that stores the current values, voltage values, and/or heat input values in association with contact-tip-to-work-distances, stickout lengths, and/or arc lengths. The electrode preheat control circuit 322 may, for example, use the average preheating current and/or a preheating current sample as a lookup key for a lookup table selected based on the setpoint welding-type voltage, the average welding-type current, and/or the target heat input. In some examples, the setpoint welding-type voltage, the average welding-type current, and/or the target heat input may be used to narrow a list of the preheating current values in the lookup table(s) 328 to be searched.

At block 1204, the electrode preheat control circuit 322 interpolates the CTWD, the stickout length, and/or the arc length based on the preheating current value, one or more stored preheating current value(s) in the memory device 326, and associated stored CTWDs, stickout lengths, and/or the arc lengths. For example, where the preheating current sample has a higher resolution than the current value(s) stored in the lookup table 328, the example electrode preheat control circuit 322 may select two preheating current values from the lookup table 328 between which the preheating current value used for the lookup falls. The electrode preheat control circuit 322 may then interpolate a CTWD, a stickout length, and/or an arc length based on the CTWDs, stickout lengths, and/or the arc lengths associated with the selected stored preheating current values. Interpolation may include linear or non-linear interpolation.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A consumable electrode-fed welding-type system, comprising:
   a welding-type current source configured to provide welding-type current to a welding-type circuit, the welding-type circuit comprising a welding-type electrode and a first contact tip of a welding torch;
   an electrode preheating circuit configured to provide preheating current through a first portion of the welding-type electrode via a second contact tip of the welding torch;

current interpreter circuitry configured to determine a change in a contact-tip-to-work-distance between the first contact tip and a workpiece based on at least one of the welding-type current or the preheating current; and an electrode preheating control circuit configured to adjust at least one of the preheating current or an electrode feed speed based on the change in the contact-tip-to-work-distance.

2. The system as defined in claim 1, wherein the current interpreter circuitry is configured to detect the change in the contact-tip-to-work-distance by:
measuring the preheating current;
determining the contact-tip-to-work-distance based on the measurement of the preheating current;
identifying a change in the at least one of the welding-type current or the preheating current; and
determining the change in the contact-tip-to-work-distance based on the change in the at least one of the welding-type current or the preheating current.

3. The system as defined in claim 2, wherein the current interpreter circuitry is configured to measure the preheating current by measuring a first average preheating current over a first time period.

4. The system as defined in claim 3, wherein the current interpreter circuitry is configured to identify the change in the preheating current by identifying a difference between 1) a second average preheating current over a second time period and 2) the first average preheating current.

5. The system as defined in claim 2, wherein the current interpreter circuitry is configured to determine the contact-tip-to-work-distance based on the preheating current by looking up the preheating current in a table associating preheating current values with contact-tip-to-work-distances.

6. The system as defined in claim 5, wherein the current interpreter circuitry is configured to determine the contact-tip-to-work-distance based on the preheating current by looking up at least one of a welding setpoint voltage, the welding-type current, a heat input, or a resistance in the welding-type circuit.

7. The system as defined in claim 1, wherein the current interpreter circuitry comprises a current sensor, the system further comprising a memory device configured to store a plurality of preheating current measurement values associated with corresponding contact-tip-to-work-distances.

8. The system as defined in claim 1, wherein the welding-type current source is configured to execute a voltage-controlled control loop to provide the welding-type current.

9. The system as defined in claim 8, wherein the electrode preheating control circuit is configured to control the preheating current to maintain the welding-type current within a current range and to maintain a heat input within a heat input range.

10. The system as defined in claim 1, wherein the electrode preheating control circuit is configured to adjust the preheating current to maintain a constant heat input into a workpiece.

11. The system as defined in claim 1, wherein the first contact tip is configured to conduct the preheating current, the first portion of the welding-type electrode being between the first and second contact tips of the welding torch.

12. A method, comprising:
providing welding-type current using a welding-type current source to a welding-type circuit, the welding-type circuit comprising a welding-type electrode and a first contact tip of a welding torch;
providing preheating current through a first portion of the welding-type electrode via a second contact tip of the welding torch; and
adjusting at least one of the preheating current or an electrode feed speed based on a change in a contact-tip-to-work-distance between the first contact tip and a workpiece.

13. The method as defined in claim 12, wherein the determining of the change comprises:
measuring the preheating current;
determining the at least one of the contact-tip-to-work-distance or the stickout length based on the measurement of the preheating current;
identifying a change in the at least one of the welding-type current or the preheating current; and
determining a change in the at least one of the contact-tip-to-work-distance of the welding torch based on the change in the at least one of the welding-type current or the preheating current.

14. The method as defined in claim 12, wherein the adjusting of the at least one of the preheating current or the electrode feed speed comprises maintaining a substantially constant heat input into a workpiece.

15. The method as defined in claim 12, wherein the determining of the change comprises looking up a change in the preheating current in a lookup table stored in a memory device.

16. The method as defined in claim 12, further comprising determining the change in at least one of the contact-tip-to-work-distance of the welding torch.

17. The method as defined in claim 16, wherein the determining of the change in at least one of the contact-tip-to-work-distance of the welding torch or the stickout length comprises looking up at least one of the preheating current or the welding-type current in a lookup table.

18. The method as defined in claim 16, wherein the determining of the change in at least one of the contact-tip-to-work-distance of the welding torch or the stickout length comprises looking up at least one of a resistance of the welding-type circuit, an enthalpy, a heat input, or a welding-type voltage setpoint in a lookup table.

19. The method as defined in claim 12, wherein the adjusting of the preheating current or the electrode feed speed comprises controlling the preheating current or the electrode feed speed to maintain a target arc length.

20. A consumable electrode-fed welding-type system, comprising:
a welding-type current source configured to provide welding-type current to a welding-type circuit, the welding-type circuit comprising a welding-type electrode and a first contact tip of a welding torch;
an electrode preheating circuit configured to provide preheating current through a first portion of the welding-type electrode via a second contact tip of the welding torch;
sensors configured to monitor the preheating current and the welding-type current; and
a control circuit configured to maintain a constant heat input into a weld by adjusting at least one of the preheating current or an electrode feed speed based on a combination of the preheating current and the welding-type current as a proxy for contact-tip-to-work-distance between the first contact tip and a workpiece.

* * * * *